(12) United States Patent
Yamamichi et al.

(10) Patent No.: US 7,693,795 B2
(45) Date of Patent: Apr. 6, 2010

(54) DIGITAL WORK PROTECTION SYSTEM

(75) Inventors: Masato Yamamichi, Kadoma (JP);
Natsume Matsuzaki, Mino (JP);
Toshihisa Abe, Izumisano (JP);
Toshihisa Nakano, Neyagawa (JP);
Masaya Miyazaki, Ikeda (JP)

(73) Assignee: Panasonic Corporation, Osaka (JP)

( * ) Notice: Subject to any disclaimer, the term of this patent is extended or adjusted under 35 U.S.C. 154(b) by 1416 days.

(21) Appl. No.: 10/655,129

(22) Filed: Sep. 5, 2003

(65) Prior Publication Data
US 2004/0073516 A1    Apr. 15, 2004

(30) Foreign Application Priority Data
Sep. 5, 2002    (JP)    ............................. 2002-260521

(51) Int. Cl.
*G06F 21/00*    (2006.01)
(52) U.S. Cl. ............................. 705/52; 705/51; 705/59
(58) Field of Classification Search ................... 705/51, 705/52, 59
See application file for complete search history.

(56) References Cited
U.S. PATENT DOCUMENTS

| | | | | |
|---|---|---|---|---|
| 5,892,900 A | * | 4/1999 | Ginter et al. ................... | 726/26 |
| 6,865,550 B1 | * | 3/2005 | Cok ............................. | 705/51 |
| 6,934,693 B2 | * | 8/2005 | Stefik et al. .................... | 705/51 |
| 7,111,173 B1 | * | 9/2006 | Scheidt ......................... | 713/186 |

FOREIGN PATENT DOCUMENTS

JP    7-297818    11/1995

OTHER PUBLICATIONS

Matsushita Technical Journal, Apr. 2002, vol. 48, No. 2, pp. 1-5 with verified English translation.

* cited by examiner

*Primary Examiner*—Andrew J. Fischer
*Assistant Examiner*—Joshua Murdough
(74) *Attorney, Agent, or Firm*—Wenderoth, Lind & Ponack, L.L.P.

(57) ABSTRACT

Disclosed is a digital work protection system enabling a content distributor to flexibly define usage patterns of content permitted for users. The system is composed of a recording device and a playback device. The recording device acquires a digital work, range information showing a permission range within which the digital work is permitted to be used, and a subrange key for each subrange, generates an encryption key using all the acquired subrange keys, encrypts the digital work based on the encryption key to generate encryption information, and writes the encryption information and the range information to a recording medium. The playback device reads the range information and the encrypted information from the recording medium, acquires a subrange key for each subrange, generates a decryption key using all the acquired subrange keys, decrypts the encrypted information based on the decryption key to generate a digital work, and plays the digital work.

21 Claims, 17 Drawing Sheets

FIG.3

DEPENDENCY INFORMATION TABLE 121

| DEPENDENCY INFORMATION | | | | |
|---|---|---|---|---|
| DEPENDENCY INFORMATION ID | GROUP DEPENDENCY FLAG | MEDIUM DEPENDENCY FLAG | DEVICE DEPENDENCY FLAG | USER DEPENDENCY FLAG |
| 1 | 1 | 1 | 1 | 1 |
| 2 | 1 | 1 | 1 | 0 |
| 3 | 1 | 1 | 0 | 1 |
| 4 | 1 | 0 | 1 | 1 |
| 5 | 0 | 1 | 1 | 1 |
| 6 | 1 | 1 | 0 | 0 |
| 7 | 1 | 0 | 1 | 0 |
| 8 | 1 | 0 | 0 | 1 |
| 9 | 0 | 1 | 1 | 0 |
| 10 | 0 | 1 | 0 | 1 |
| 11 | 0 | 0 | 1 | 1 |
| 12 | 1 | 0 | 0 | 0 |
| 13 | 0 | 1 | 0 | 0 |
| 14 | 0 | 0 | 1 | 0 |
| 15 | 0 | 0 | 0 | 1 |

FIG.4

CHARGE TABLE 131

| CHARGE INFORMATION | | | | | |
|---|---|---|---|---|---|
| DEPENDENCY INFORMATION ID | DEPENDENCY INFORMATION CHARGE | CONDITIONAL CHARGES | | | |
| | | TRANSFER CHARGE | HOLD CHARGE | 6-MONTH CHARGE | 10-TIME USE CHARGE |
| 1 | ¥1000 | ¥500 | ¥500 | ¥300 | ¥300 |
| 2〜5 | ¥700 | | | | |
| 6〜11 | ¥500 | | | | |
| 12〜15 | ¥300 | | | | |

FIG.5

CONTENT TABLE 141

| CONTENT FEATURE INFORMATION | | | | |
| --- | --- | --- | --- | --- |
| CONTENT ID | TITLE | PLAYBACK TIME | CONTENT CHARGE | DIRECTOR/CAST INFORMATION |
| C001 | GALAXY WARS EPISODE 1 | 2h | ¥500 | GOLDENBERG |
| C002 | ATTRACTIVE PLANET - JOURNEY TO THE CENTER OF MARS | 45m | ¥300 | SIROSAWA |
| C003 | A LOVE STORY IN SIRIUS | 2h | ¥500 | YAMASHITA |
| C004 | GALAXY WARS EPISODE 2 | 2h | ¥500 | GOLDENBERG |
| ⋮ | ⋮ | ⋮ | ⋮ | ⋮ |

FIG.6

USER TABLE

| USER ID | USER PURCHASE INFORMATION ||||| 151 |
| | CONTENT ID | DEPENDENCY INFORMATION ID | CONDITION INFORMATION | DATE | TOTAL CHARGE | |
| --- | --- | --- | --- | --- | --- | --- |
| U001 | C001 | 1 | — | 2002.3.21 | ¥1,500 | |
| U002 | C002 | 5 | PERMITTED TO TRANSFER PERMITTED TO HOLD | 2003.3.16 | ¥800 | |
| U003 | C003 | 7, 1 | TEN-TIME USE | 2004.5.1 | ¥1,300 | |
| U004 | C001 | 6, 1 | SIX-MONTH USE | 2004.6.12 | ¥1,300 | |
| ⋯ | ⋯ | ⋯ | ⋯ | ⋯ | ⋯ | |

FIG.7

RECORDATION CONTROL INFORMATION RCI    171

| GROUP DEPENDENCY FLAG GFlag | 1 |
|---|---|
| MEDIUM DEPENDENCY FLAG MFlag | 1 |
| DEVICE DEPENDENCY FLAG DFlag | 0 |
| USER DEPENDENCY FLAG UFlag | 0 |

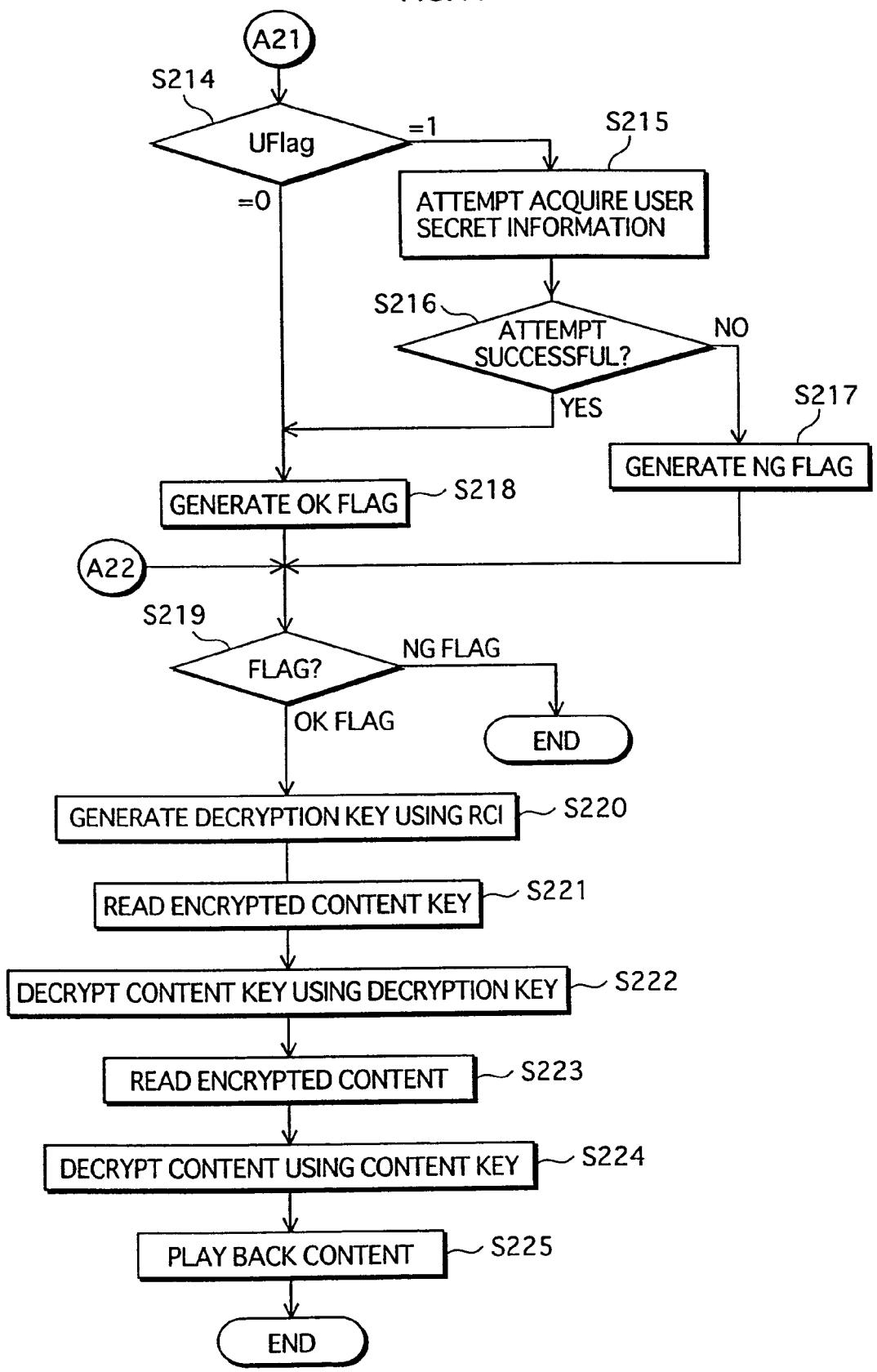

DIGITAL WORK PROTECTION SYSTEM

This application is based on an application No. 2002-260521 filed in Japan, the content of which is hereby incorporated by reference.

BACKGROUND OF THE INVENTION (1) Field of the Invention

The present invention relates to a technique to record and play back digital works while protecting digital works from unauthorized use.

(2) Description of the Related Art

Generally, digital contents such as music, video, and computer programs are recorded and copied without any degradation. This feature gives rise to a problem as follows. That is, contents that are available on a chargeable basis may be used or copied by a third party without proper authorization. Such unauthorized use violates the copyright of contents. In addition, with the recent widespread of distribution of music contents on DVD (Digital Versatile Disc) or via the Internet, an increasing numbers of digital contents are distributed. With this being the situation, it is strongly desired that the problem stated above be addressed.

One conventional mechanism addressing the problem is Content Protection for Recordable Media (CPRM), which prohibits unauthorized copying of a content recorded on a recording medium. This mechanism is disclosed, for example, in Matsushita Technical Journal, Vol. 48. No. 2, (April, 2002 issue) published by Matsushita Electric Industrial Co., Ltd. on Apr. 18, 2002 (page 7). The following is a brief description of CPRM.

At the time of manufacturing, a unique medium ID is recorded to each recording medium. A medium ID is information that is readable but not possibly altered or erased. To record a content to such a recording medium, it is required to generate a content key using a media ID of that recording medium, and encrypt the content with the content key. The content is then recorded on the recording medium in encrypted form. The encrypted content recorded on the recording medium may be copied to another recording medium. However, the medium ID of the destination recording medium is different from the medium ID of the source recording medium, so that it is impossible to generate a content key that would properly decrypt the encrypted content on the destination recording medium. That is to say, a content copied to another recording medium can not be decrypted, so that unauthorized copying is prevented.

There is disclosed another mechanism to address the problem stated above (see, for example, JP-A-7-297818). This mechanism is to exclusively allow authorized users who belong to a specific user group to freely copy contents for a backup purpose, for example, or to use contents on a terminal other than a receiving terminal. In this way, a content distributor is capable of preventing unauthorized use of contents by users who do not belong to the user group, so that the copyright of contents are protected. The following is a brief description of this mechanism.

First of all, each user who belongs to a group has an IC card storing a group key unique to the group. In order to distribute a content that should be usable exclusively to the group, a content distributor encrypts the content with the group key unique to the group, and distributes the content in encrypted from. Thus, users who do not belong to the group are not able to use the distributed content as those users are without the group key that is required to decrypt the content. In this way, the content distributor manages to prevent unauthorized use of contents by users who do not belong to the user group.

Unfortunately, however, the conventional mechanisms still have following problems. According to the conventional mechanisms, a usage pattern permitted for authorized users is fixed. To be more specific, for example, a content distributor is not able to flexibly set usage patterns so as to (a) prohibit copying of a content A, (b) prohibit a content B from being used by a device outside a predetermined group, while permitting in-group devices to make backup copies, and (c) permit a content C to be used exclusively on a predetermined device. In short, with the conventional mechanisms, a content distributor can not flexibly permit different usage patterns for each content to be distributed or for each user being a distribution target.

SUMMARY OF THE INVENTION

In order to address the problems stated above, an object of the present invention is to provide a content protection system, a recording device, a playback device, a recording method, a playback method, a recording program, and a playback program each of which allows a content distributor to flexibly set a usage pattern of a content distributed to a user, while protecting the content from unauthorized use.

To achieve the object stated above, the present invention provides a digital work protection system for protecting digital works from unauthorized use. The digital work protection system is composed of a reading device and a playback device.

The reading device includes a digital work acquiring unit, a first key acquiring unit, a first key generating unit, an encrypting unit, and a writing unit. The digital work acquiring unit is operable to acquire a digital work and range information showing a permission range within which the digital work is permitted to be used. The permission range is composed of at least one subrange adopted out of a plurality of subranges. The range information includes a plurality of pieces of adoption information each corresponding to one of the subranges and showing whether a corresponding subrange is to be adopted. The first key acquiring unit is operable to acquire a subrange key for each subrange that is shown to be adopted in the adoption information, thereby acquiring at least one subrange key. The first key generating unit is operable to generate an encryption key using all the acquired subrange keys. The encrypting unit is operable to encrypt the digital work based on the encryption key, thereby generating encrypted information. The writing unit is operable to write the range information and the encrypted information to a recording medium.

The playback device includes a reading unit, a second key acquiring unit, a second key generating unit, a digital work generating unit, and a playback unit. The reading unit is operable to read the range information and the encrypted information from the recording medium. The second key acquiring unit is operable to acquire a subrange key for each subrange that is shown to be adopted in the adoption information included in the read range information, thereby acquiring at least one subrange key. The second key generating unit is operable to generate a decryption key using all the subrange keys acquired by the second key acquiring unit. The digital work generating unit is operable to decrypt the read encrypted information based on the decryption key, thereby generating a digital work. The playback unit is operable to play back the generated digital work.

According to the above digital work protection system having the above structure, the recording device writes range information and encrypted information to a recording medium. The range information is composed of a plurality of pieces of adoption information each showing whether a corresponding subrange is to be adopted, and the encrypted information is generated by encrypting a digital work based on subrange keys acquired according to the adoption information. Consequently, the permission range within which the digital work is permitted to be used is flexibly determined by suitably adopting any of the plurality of subranges. In addition, the playback device decrypts the encrypted information based on subrange keys acquired according to the adoption information, and plays back a digital content generated as a result of the decryption. Consequently, only playback devices capable of acquiring correct subrange keys that are shown to be adopted in the adoption information are allowed to decrypt the encrypted information and play back the resulting digital work.

In the above manner, the present invention enables a content distributor to flexibly determine different usage patterns for each content and/or for each user, while protecting the copyright of the content distributor.

BRIEF DESCRIPTION OF THE DRAWINGS

These and the other objects, advantages and features of the invention will become apparent from the following description thereof taken in conjunction with the accompanying drawings which illustrate a specific embodiment of the invention.

In the drawings:

FIG. 3 is a view showing the data structure of a dependency information table 121;

FIG. 4 is a view showing the data structure of a charge table 131;

FIG. 5 is a view showing the data structure of a content table 141;

FIG. 6 is a view showing the data structure of a user table 151;

FIG. 7 is a view showing the data structure of recordation control information RCI;

FIG. 8 is a block diagram showing the structure of a DVD recorder 200a along with the data structure of a DVD 400a;

FIG. 9 is a block diagram showing the structure of a DVD player 300a along with the data structure of the DVD 400a;

FIG. 17 is the flowchart showing the processing for playing back a content, and continued from FIG. 16.

DESCRIPTION OF THE PREFERRED EMBODIMENT

1. Digital Work Protection System 10

First, description is given to a digital work protection system 10 as one embodiment of the present invention.

1.1 Structure of Digital Work Protection System 10

Figure 1:
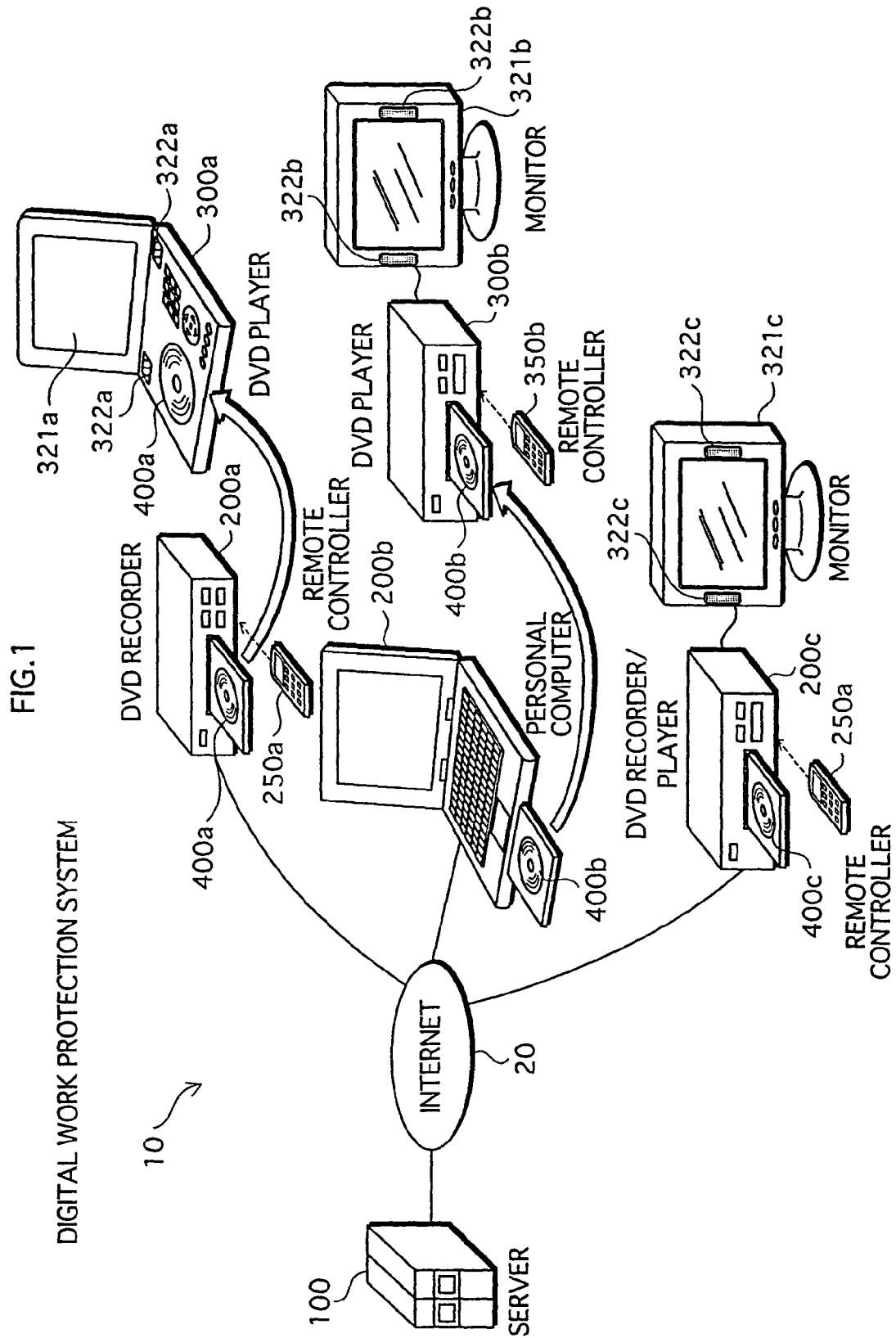
FIG. 1 is a view showing the structure of a digital work protection system 10.

As shown in FIG. 1, the digital work protection system 10 is composed of a server 100, a DVD recorder 200a, a DVD player 300a, a personal computer 200b, a DVD player 300b, a monitor 321b, a DVD recorder/player 200c, and a monitor 321c.

The server 100 is separately connected to the DVD recorder 200a, the personal computer 200b, and the DVD recorder/player 200c via the Internet 20.

The DVD recorder 200a acquires a content from the server 100 via the Internet 20, and writes the acquired content on a DVD 400a. The DVD 400a on which the content is recorded is mounted by a user on the DVD player 300a. The DVD player 300a reads the content from the mounted DVD 400a and plays back the read content.

The personal computer 200b acquires a content from the server 100 via the Internet 20, and writes the acquired content on a DVD 400b. The DVD 400b on which the content is recorded is mounted by a user on the DVD player 300b. The DVD player 300b reads the content from the mounted DVD 400b, and plays back the read content.

The DVD recorder/player 200c acquires a content from the server 100 via the Internet 20, and writes the acquired content on a DVD 400c. Additionally, the DVD recorder/player 200c reads the content from the DVD 400c, and plays back the read content.

1.2 Structure of Server 100

Figure 2:
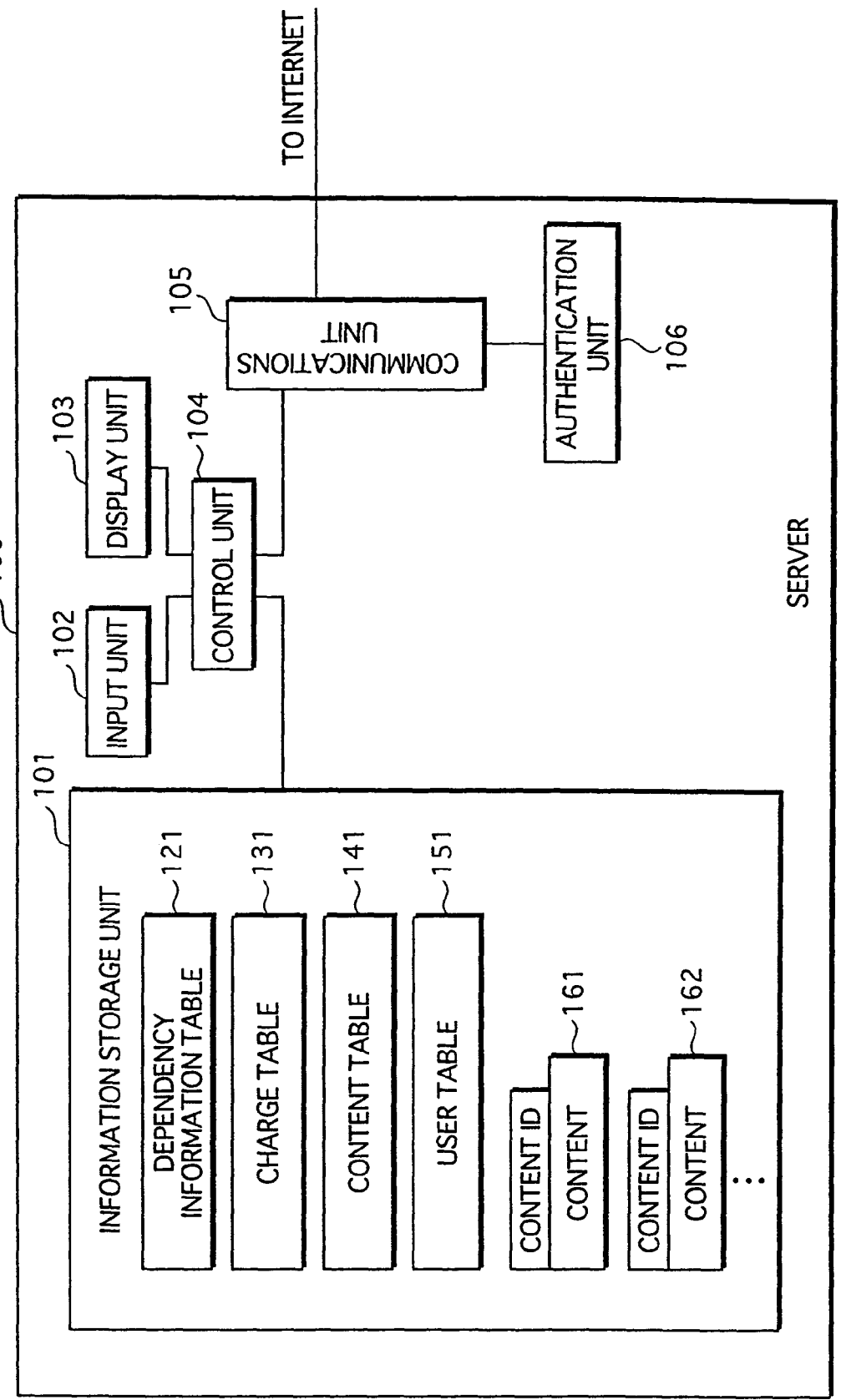
FIG. 2 is a block diagram showing the functional structure of a server 100.

As shown in FIG. 2, the server 100 is composed of an information storage unit 101, an input unit 102, a display unit 103, a control unit 104, a communications unit 105, and an authentication unit 106.

The server 100 is specifically a computer system composed generally of a microprocessor, ROM, RAM, a hard disk unit, a LAN connector unit, a display unit, a keyboard, and a mouse. The RAM or the hard disk unit stores a computer program. The server 100 performs its function by the microprocessor operating according to the computer program.

The server 100 is run and administered by a film production company, a film-distributing firm, or a content distributor, for example.

(1) Information Storage Unit 101 As shown in FIG. 2, the information storage unit 101 stores a dependency information table 121, a charge table 131, a content table 141, and a user table 151 as well as contents 161, 162 . . .

Contents 161, 162 . . .

The content 161 is a compression-coded data generated by compression-coding audio information and video information that together represent a movie. The content 161 is uniquely identified by a content ID. Further, other contents including the content 162 are compression-coded data similar to the content 161.

Dependency Information Table 121

The dependency information table 121 includes, as in an example shown in FIG. 3, fifteen pieces of dependency information. Each piece of dependency information is composed of a dependency information ID, a group dependency flag, a medium dependency flag, a device dependency flag, and a user dependency flag.

Each piece of dependency information defines a permission range within which permission to use a corresponding content is given. Since the dependency information table 121 includes fifteen pieces of dependency information, there are fifteen different permission ranges defined.

Each piece of dependency information defines a permission range with a combination of a group range restricted to a specific group, a medium range restricted to a specific recording medium, a device range restricted to a specific recorder, and a user range restricted to a specific user.

Note that the group mentioned above includes at least one device capable of using contents, and the group range encompasses every device that belongs to the group. Accordingly, to permit usage of a content within the group range equally means that every device that belongs to the group is permitted to use the content. The medium range encompasses one recording medium. Accordingly, to permit usage of a content within the medium range equally means that the content recorded on that specific recording medium is permitted to be used. The device range encompasses one recording device. Accordingly, to permit usage of a content within the device range equally means that that specific recording device is permitted to use the content. The user range encompasses one user. Accordingly, to permit usage of a content within the user range equally means that that specific user is permitted to use the content.

Each piece of dependency information is composed of a group dependency flag, a medium dependency flag, a device dependency flag, and a user dependency flag which correspond to a group range, a medium range, a device range, and a user range, respectively. Each of the flags indicates whether a corresponding range is to be adopted to define a permission range.

A dependency information ID is identification information that uniquely identifies a piece of dependency information that contains the same dependency information ID.

A group dependency flag shows whether to adopt the group range in defining a permission range by the dependency information that includes the flag. The group dependency flag is a bit having either "1" or "0", and set to "1" when the group range is to be adopted, and otherwise set to "0".

The medium dependency flag shows whether to adopt the medium range in determining a permission range by the dependency information that includes the flag. The medium dependency flag is a bit having either "1" or "0", and set to "1" when the medium range is to be adopted, and otherwise set to "0".

The device dependency flag shows whether to adopt the device range in determining a permission range by the dependency information that includes the flag. The device dependency flag is a bit having either "1" or "0", and set to "1" when the device range is to be adopted, and otherwise set to "0".

The user dependency flag shows whether to adopt the user range in determining a permission range by the dependency information that includes the flag. The user dependency flag is a bit having either "1" or "0", and set to "1" when the user range is to be adopted, and otherwise set to "0".

As above, each of the group dependency flag, the medium dependency flag, the device dependency flag, and the user dependency flag is set to either "1" or "0". Consequently, there are sixteen different combinations, and thus there are sixteen different pieces of dependency information. Yet, a piece of dependency information in which all the flags are set to "0" is excluded because such dependency information substantially fails to define a permission range.

Here, for example, when the group dependency flag, the medium dependency flag, the device dependency flag, and the user dependency flag are all set to "1", such dependency information represents that a corresponding content is permitted to be used exclusively within one specific group, on one specific recording medium, with one specific recording device, and by one specific user.

In another example, when the group dependency flag, the medium dependency flag, the device dependency flag, and the user dependency flag are set to "1", "1", "0", and "0", respectively, such dependency information represents that a corresponding content is permitted to be used exclusively within one specific group and on one specific recording medium.

In yet another example, when the group dependency flag, the medium dependency flag, the device dependency flag, and the user dependency flag are set to "0", "0", "1", and "0", respectively, such dependency information represents that a corresponding content is permitted to be used exclusively with one specific recording device.

In yet another example, when the group dependency flag, the medium dependency flag, the device dependency flag, and the user dependency flag are set to "0", "0", "0", and "1", respectively, such dependency information represents that a corresponding content is permitted to be used exclusively by one specific user.

Charge Table 131

The charge table 131 includes, as in an example shown in FIG. 4, a plurality of pieces of charge information each composed of a dependency information ID, a dependency information charge, and conditional charge information. Each piece of conditional charge information is composed of a transfer charge, a hold charge, a six-month charge, and a ten-time use charge.

Description of the dependency information ID has been given above in relation to the dependency information table 121, and not repeated here.

A dependency information charge shows an additional charge for use of a content within the permission range defined by a piece of dependency information that is identified by the dependency information ID included in the same piece of charge information.

For example, the charge table 131 shows that the additional charge is "¥1,000" for use of a content within the permission range defined by a piece of dependency information that is identified by the dependency information ID "1". Similarly, the additional charge is "¥700" for use of a content within the permission range defined by a piece of dependency information that is identified by any of the dependency information IDs "2" to "5". The additional charge is "¥500" for use of a content within the permission range defined by a piece of dependency information that is identified by any of the dependency information IDs "6" to "11". The additional charge is "¥300" for use of a content within the permission range defined by a piece of dependency information that is identified by any of the dependency information IDs "12" to "15". As above, the dependency information charges shown in the charge table 131 are more expensive when a corresponding permission range is broader and less expensive when a corresponding permission range is narrower.

Yet, it is not required to set the additional charges in the above-described manner. For example, it is possible to set a more expensive charge for use of a content within the permission range defined by a specific piece of dependency information, and a less expensive charge for use of a content within the permission range defined by another specific piece of dependency information.

Each conditional charge shown by the conditional charge information is an amount to be charged to satisfy a corresponding condition.

To be more specific, a transfer charge is an amount to be charged for transferring a once-purchased content to another user. In this example, the transfer charge for is "¥500". Note that the transfer charge is not bound by the dependency information IDs.

A hold charge is an amount to be charged for holding a once-purchased content even after transferring the content to another user. In this example, the hold charge is "¥500". Note that the hold charge is not bound by the dependency information IDs.

A six-month charge is an amount to be charged for broadening the permission range of a content six months after purchase of the content. The six-month charge is made in the following case, for example. Suppose a content at the time of purchase is originally permitted to be used within the permission range defined by the dependency information that is identified by the dependency information ID "7". Yet, six months after the purchase, the content is alternatively permitted to be used within the permission range of the content defined by the dependency information identified by the dependency information ID "1". In this example, the six-month charge is "¥300". Note that the six-month charge is not bound by the dependency information IDs.

A ten-time use charge is an amount to be charged for broadening the permission range of a content after using the content for ten times. The ten-time use charge is made in the following case, for example. Suppose, a content at the time or purchase is originally permitted to be used within the permission range defined by the dependency information that is that is identified by the dependency information ID "7". Yet, after ten times of playback, the content is alternatively permitted to be used within the permission range defined by the dependency information that is identified by the dependency information ID "1". In this example, the ten-time use charge is "¥300". Note that the ten-time use charge is not bound by the dependency information IDs.

Content Table 141

As in an example shown in FIG. 5, the content table 141 includes a plurality of pieces of content feature information each composed of a content ID, a title, a playback time, a content charge, director and cast information.

Each piece of content feature information is in one-to-one correspondence with contents stored in the information storage unit 101.

A content ID is identification information identifying a corresponding content. A title is a name of a corresponding content.

A playback time is a time taken to play back a corresponding content entirely from the beginning to the end.

A content charge is an amount to be charged for use of a corresponding content.

Director and cast information is information regarding a director and cast of a corresponding content.

User Table 151

As shown in FIG. 6, the user table 151 includes a plurality of pieces of user purchase information each composed of a user ID, a content ID, one or two dependency information IDs, condition information, a date, and a total charge.

A user ID is identification information uniquely identifying a user.

A content ID is identification information identifying a content purchased by the user who is identified by a corresponding user ID.

Each dependency information ID is identification information identifying a piece of dependency information that defines a permission range within which the content is permitted to be used.

When two dependency information IDs are included in a piece of user purchase information, the first dependency information ID identifies a piece of dependency information that is to be used initially. The second dependency information ID identifies a piece of dependency information that is to be used instead of the initial dependency information after using the content for ten times or after expiry of a six-month period from the purchase.

Condition information shows purchase conditions selected for the content by the user at the time the content is purchased. Examples of the selected purchase conditions include "permitted to transfer", "permitted to hold", "ten-time use", and "six-month use". Details of these conditions have already been described above.

A date is a year, month, and day of purchase of the content by the user.

The charge is a total amount of charges for use of the content within the permission range defined by the dependency information identified by the above dependency information ID and for use of the content under the conditions shown by the condition information.

(2) Communication Unit 105

The communications unit 105 is connected to an external device via the Internet 20, and performs transmission of information between the external device and the authentication unit 106 or between the external device and the control unit 104.

Here, the external device is any of the DVD recorder 200a, the personal computer 200b, and the DVD recorder/player 200c.

(3) Authentication Unit 106

The authentication unit 106 performs mutual device authentication with the external device before the communications unit 105 performs transmission of information between the control unit 104 and the external device. Since mutual device authentication is well known in the art, description thereof is omitted here.

In the case where the mutual device authentication fails, the authentication unit 106 controls the control unit 104 so as to prohibit transmission of any further information between the control unit 104 and the external device.

(4) Control Unit 104

Information Reception

The control unit 104 receives from the external device via the Internet 20 and the communications unit 105, a request for transmission of a list of contents, a user ID identifying a user of the external device, a content ID identifying a content that the user desires to purchase, and user-selected conditions of the content to be purchased. Here, the purchase conditions received include information defining a permission range of the content. In addition, the purchase conditions include any and possibly all of the following: information showing whether to permit to transfer the content, information showing whether to permit to hold the content even after transfer of the content, information showing whether to broaden the permission range of the content six months after the purchase, and information showing whether to broaden the permission range of the content after ten times of use.

Transmission of List

On receiving the request, the control unit 104 reads all the pieces of content feature information from the content table 141 stored in the information storage unit 101. The control unit 104 then transmits the read content feature information, as a content list, to the external device via the communications unit 105 and the Internet 20.

Calculation of Total Charge

On receiving the content ID and the purchase conditions, the control unit 104 calculates the total charge in the following manner.

(a) The control unit 104 reads from the content table 141, a piece of content feature information that includes a content ID matching the received content ID. The control unit 104 then extracts the content charge from the read content feature information, and temporarily determines the extracted content charge as the total charge to be made.

(b) Next, the control unit 104 extracts information showing the permission range of the content from the received purchase conditions, and reads from the dependency information table 121, a piece of dependency information that matches the extracted information, and extracts the dependency information ID from the read dependency information. Next, the control unit 104 reads from the charge table 131, a piece of charge information that includes a dependency information ID matching the extracted dependency information ID, and then extracts the dependency information charge from the read charge information. The control unit 104 then adds all the extracted charges to the total charge.

(c) Here, the received purchase conditions may include any and possibly all of the following: information permitting to transfer the content, information permitting to hold the content even after transfer of the content, information permitting to broaden the permission range of the content six months after the purchase, and information permitting to broaden the permission range of the content after ten times of use. Consequently, the control unit 104 reads from the charge table 131 a charge corresponding to each purchase condition, and adds the all the read charges to the total charge.

In the above manner, the control unit 104 calculates the total charge for purchasing the content.

Notification and Payment of Charge

The control unit 104 transmits information showing the calculated total charge to the external device via the communications unit 105 and the Internet 20.

Next, the control unit 104 performs processing in conjunction with the external device so as to receive the payment. The method for receiving payment is widely known in the art, and thus detailed description thereof is omitted.

Addition of User Purchase Information to User Table 151

The control unit 104 generates user purchase information that is composed of the user ID, the content ID, the dependency information ID, the condition information, the date, and the total charge.

Here, the user ID and the content ID are the ones received from the external device. The dependency information ID is the one extracted from the dependency information table 121. The condition information the one received from the external device and showing, for example, whether to permit to transfer the content, whether to permit to hold the content even after transfer of the content, whether to broaden the permission range of the content six months after the purchase, and whether to broaden the permission range of the content after ten times of use. The date is the purchase year, month, and day of the content. The total charge is the amount calculated in the above-described manner.

The control unit 104 then writes the generated piece of the user purchase information to add to the user table 151.

Generation of Recordation Control Information

The control unit 104 desingates the four dependency flags used to calculate the total charge respectively as a group dependency flag GFlag, a medium dependency flag MFlag, a device dependency flag DFlag, and a user dependency flag UFlag. The control unit 104 then generates recordation control information RCI that is composed of the group dependency flag GFlag, the medium dependency flag MFlag, the device dependency flag DFlag, and the user dependency flag UFlag, and securely transmits the generated recordation control information RCI to the external device via the communications unit 105 and the Internet 20. When there is condition information, the control unit 104 also transmits the condition information. Further, in the case the condition information shows any of the "ten-time use" condition and the "six-month use" condition, the control unit 104 transmits two pieces of recordation control information RCI.

For the sake of security, the generated recordation control information RCI is transmitted using the SSL (Secure Sockets Layer) protocol between the communications unit 105 and the external device.

Transmission of Content

The control unit 104 reads from the information storage unit 101 the content identified by the received content ID, and securely transmits the read content to the external device via the communications unit 105 and the Internet 20.

For the sake of security, the read content is transmitted using the SSL protocol between the communications unit 105 and the external device.

(5) Input Unit 102 and Display Unit 103

The input unit 102 receives an instruction or data inputted by a user of the server 100, and outputs the received instruction or data to the control unit 104.

The display unit 103 displays various kinds of information under the control of the control unit 104.

1.3 DVD 400a

The DVD 400a is, for example, a recordable and portable recording medium such as DVD-RAM. As in an example shown in FIG. 8, the DVD 400a has a medium identification information MID recorded at the time of manufacture for uniquely identifying the DVD 400a. Further, the DVD 400a also has a recordable area into which various kinds of information may be recorded.

The DVD recorder 200a writes to the recordable area, recordation control information RCI, an encrypted content key ECK, and an encrypted content ECNT, which will be described later.

The medium identification information MID is recorded so as to be readable to the DVD recorder 200a and the DVD player 300a, but not possibly altered or deleted.

1.4 DVD Recorder 200a

Figure 8:
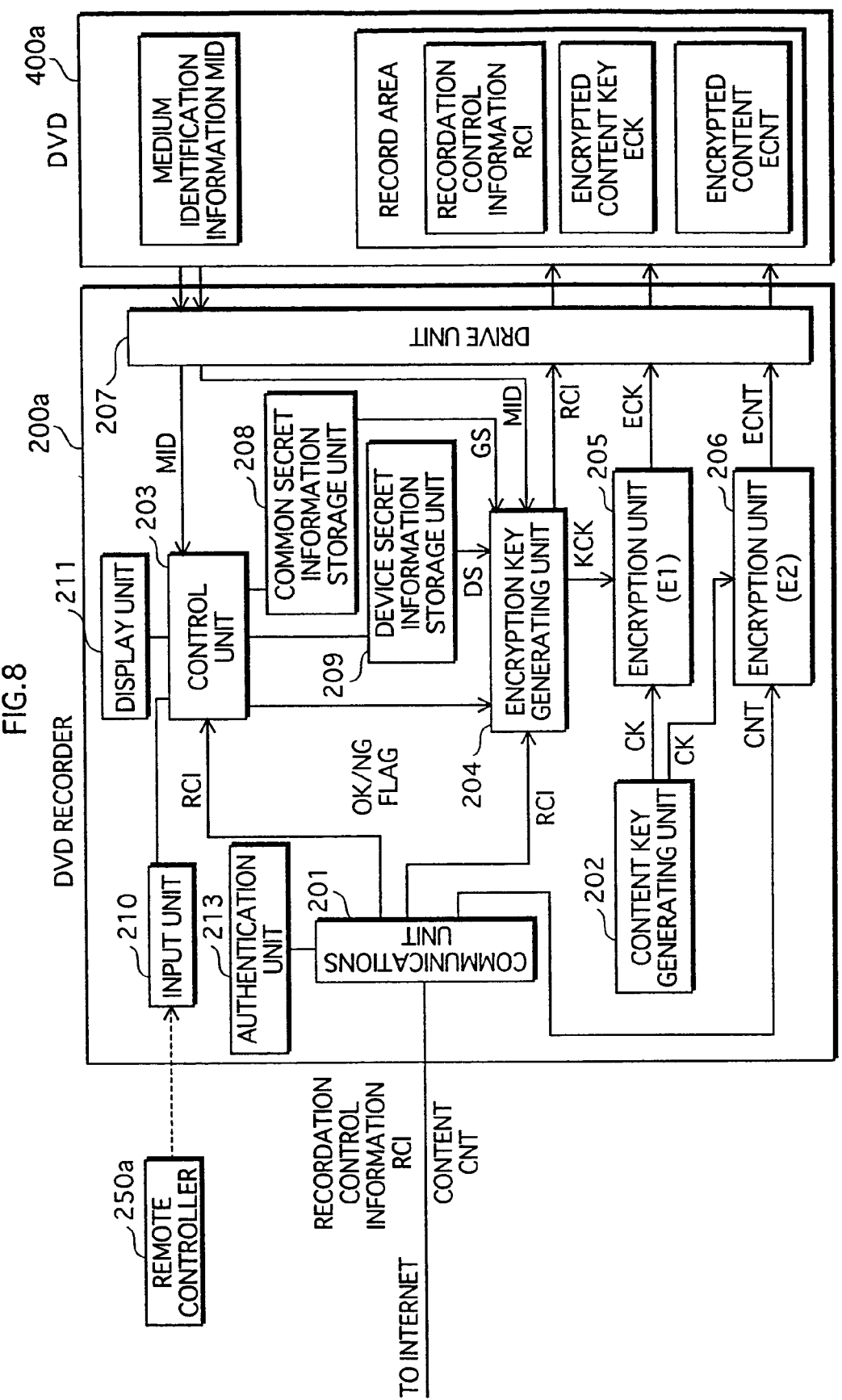

As shown in FIG. 8, the DVD recorder 200a is composed of a communications unit 201, a content key generating unit 202, a control unit 203, an encryption key generating unit 204, an encryption unit 205, an encryption unit 206, a drive unit 207, a common secret information storage unit 208, a device secret information storage unit 209, an input receiving unit 210, a display unit 211, and an authentication unit 213.

The DVD recorder 200a is specifically a computer system composed generally of a microprocessor, ROM, and RAM. The RAM stores a computer program. The DVD recorder 200a performs part of its function by the microprocessor operating according to the computer program.

(1) Common Secret Information Storage Unit 208 and Device Secret Information Storage Unit 209

The common secret information storage unit 208 pre-stores common secret information GS so as to prohibit access from any unit or device other than the control unit 203 and the encryption key generating unit 204. The common secret information GS is secret information that is commonly stored in all the devices belong to a specific group. In this example, the DVD recorder 200a and the DVD player 300a belong to the group.

The device secret information storage unit 209 stores device secret information DS that is unique to the DVD recorder 200a so as to prohibit access from any unit or device other than the control unit 203 and the encryption key generating unit 204.

(2) Communications Unit 201

The communications unit 201 is connected to the server 100 via the Internet 20. The communications unit 201 performs transmission of information between the server 100 and the authentication unit 213, between the server 100 and the control unit 203, between the server 100 and the encryption key generating unit 204, or between the server 100 and the encryption unit 206.

(3) Authentication Unit 213

The authentication unit 213 performs mutual device authentication with the server 100 before the communications unit 201 performs transmission of information between the server 100 and the control unit 203, between the server 100 and the encryption key generating unit 204, or between the server 100 and the encryption unit 206. Since mutual device authentication is well known in the art, description thereof is omitted here.

When the mutual device authentication fails, the authentication unit 213 controls the control unit 203, the encryption key generating unit 204, or the encryption unit 206 so to prohibit any further transmission of information between the server 100 and the control unit 203, between the server 100 and the encryption key generating unit 204, or between the server 100 and the encryption unit 206.

(4) Remote Controller 250a, Input Receiving Unit 210, and Display Unit 211

A remote controller 250a is provided with various buttons. In response to user operations such as a push of a button, the remote controller 250a outputs infrared signals indicative of information assigned to the pushed button.

The input receiving unit 210 receives the infrared signals outputted from the remote controller 250a, and extracts the information indicated by the received infrared signals, and outputs the extracted information to the control unit 203. The display unit 211 displays various kinds of information under the control by the control unit 203.

(5) Control Unit 203

Transmission of Information

According to the user operations received from the remote controller 250a via the input receiving unit 210, the control unit 203 transmits various kinds of information to the server 100 via the communications unit 201 and the Internet 20. The information transmitted includes a request for transmission of a list of contents, a user ID identifying the user of the DVD recorder 200a, and a content ID identifying the content that the user desires to purchase, and user-selected conditions of the content to be purchased.

As described above, the purchase conditions include information showing a permission range of the content. To be more specific, purchase conditions include any and possibly all of the following: information showing whether to permit to transfer the content, information showing whether to permit to hold the content even after transfer of the content, information showing whether to broaden the permission range of the content six months after the purchase, and information showing whether to broaden the permission range of the content after ten times of use.

Reception of Information

The control unit 203 receives from the server 100 via the Internet 20 and the communications unit 201, various kinds of information such as a list of contents that is transmitted in response to the request, information showing a total charge, and recordation control information RCI.

On receiving the content list, the control unit 203 outputs the received content list to the display unit 211, and controls the display unit 211 so as to display the content list. Next, with the use of the remote controller 250a, the user selects a content from the content list. In response, the control unit 203 receives a content ID identifying the selected content via the input receiving unit 210.

On receiving the information showing the total charge, the control unit 203 outputs to the display unit 211, the received information showing the total charge, and controls the display unit 211 so as to display the total charge along with a message prompting the user to input whether to agree to pay the total charge. Next, the control unit 203 receives from the remote controller 250a via the input receiving unit 210, information showing either agreement or disagreement. On receiving disagreement information, the control unit 203 terminates the processing regarding the content. On receiving agreement information, on the other hand, the control unit 203 performs payment processing in conjunction with the server 100 so as to receive payment for the total charge.

Verification of Recordation Control Information RCI

On receiving the recordation control information RCI, the control unit 203 extracts a group dependency flag GFlag, a medium dependency flag MFlag, a device dependency flag DFlag, and a user dependency flag UFlag from the received recordation control information RCI.

Next, the control unit 203 judges whether the group dependency flag GFlag is set to "1" or "0". Judging that the flag is set to "1", the control unit 203 attempts to acquire common secret information GS. To be more specific, the control unit 203 attempts to read the common secret information GS from the common secret information storage unit 208. Since the DVD recorder 200a is provided with the common secret information storage unit 208, the common secret information GS is surely acquired. However, in the case of a device without the common secret information storage unit 208, the common secret information GS is not acquired. Failing to acquire the common secret information GS, the control unit 203 generates an NG flag indicating that no further processing is to be performed regarding the content, and terminates the processing regarding the content.

Next, the control unit 203 judges whether the medium dependency flag MFlag is set to "1" or "0". Judging that the flag is set to "1", the control unit 203 attempts to acquire the medium identification information MID. To be more specific, the control unit 203 attempts to read the medium identification information MID from the DVD 400a via the drive unit 207. Since the DVD 400a has the medium identification information MID recorded thereon, the medium identification information MID is surely acquired. However, in the case where a recording medium having no medium identification information MID is mounted on the DVD recorder 200a, the medium identification information MID is not acquired. Failing to acquire the medium identification information MID, the control unit 203 generates an NG flag, and terminates the processing regarding the content.

Next, the control unit 203 judges whether the device dependency flag DFlag is set to "1" or "0". Judging that the flag is set to "1", the control unit 203 attempts to acquire the device secret information DS. To be more specific, the control unit 203 attempts to read the device secret information DS from the device secret information storage unit 209. Since the DVD recorder 200a is provided with the device secret information storage unit 209, the device secret information DS is surely acquired. However, in the case of a device without the device secret information storage unit 209, the device secret information DS is not acquired. Failing to acquire the device secret information DS, the control unit 203 generates an NG flag and terminates the processing regarding the content.

Next, the control unit 203 judges whether the user dependency flag UFlag is set to "1" or "0". Judging that the flag is set to "1", the control unit 203 attempts to acquire user secret information. To be more specific, the control unit 203 receives via the input receiving unit 210, a string of a plurality of numeric digits that is inputted by the user with the use of the remote controller 250a. Here, the user secret information is composed according to a predetermined configuration. For example, the user secret information is made up of six numeric digits of which first four digits are arbitrarily determined by the user and of which last two digits are the last two digits of a sum of the first four digits.

The control unit 203 judges whether the received string satisfies the predetermined configuration. Judging that the predetermined configuration is not satisfied, the control unit 203 regards that the user secret information is not acquired. Accordingly, the control unit 203 generates an NG flag and terminates the processing regarding the content. On the other hand, judging that the predetermined configuration is satisfied, the control unit 203 regards the received string as the user secret information.

As described above, the control unit 203 attempts to acquire information corresponding to each flag that is set to "1". When failing to acquire corresponding information, the control unit 203 generates an NG flag and otherwise generates an OK flag indicating that processing regarding the content is to be further performed.

Next, the control unit 203 outputs the thus generated NG flag or OK flag to the encryption key generating unit 204.

(6) Content Key Generating Unit 202

The content key generating unit 202 generates a random number as a content key CK, and outputs the thus generated content key CK to the encryption units 205 and 206.

(7) Encryption Key Generating Unit 204

The encryption key generating unit 204 receives from the server 100 via the Internet 20 and the communications unit 201, condition information and one or two pieces of recordation control information RCI. In addition, the encryption key generating unit 204 receives an NG flag or an ON flag from the control unit 203.

When receiving an NG flag, the encryption key generating unit 204 terminates the processing without generating any encryption key. When receiving an OK flag, on the other hand, the encryption key generating unit 204 generates an encryption key in the following manner.

Generation of Encryption Key

The encryption key generating unit 204 reads the common secret information GS from the common secret information storage unit 208 when the group dependency flag GFlag is set to "1". When the medium dependency flag MFlag is set to "1", the encryption key generating unit 204 acquires the medium identification information MID from the DVD 400a via the drive unit 207. When the device dependency flag DFlag is set to "1", the encryption key generating unit 204 reads the device secret information DS from the device secret information storage unit 209. Further, when the user dependency flag UFlag is set to "1", the encryption key generating unit 204 acquires the user secret information from the control unit 203.

Next, the encryption key generating unit 204 concatenates each piece of the acquired information in the order stated above, and designates the concatenated information as an encryption key KCK. Note where only one piece of information is adopted, the information is directly designated as the encryption key KCK.

Note, in addition, where two pieces of recordation control information RCI are received, the encryption key generating unit 204 generates an encryption key separately from each piece of recordation control information RCI. As a result, there are generated two encryption keys, which is equal in number to the received pieces of recordation control information RCI.

Next, the encryption key generating unit 204 outputs the generated encryption key KCK to the encryption unit 205. In the case where two encryption keys are generated, the two encryption keys are outputted to the encryption unit 205.

Next, the encryption key generating unit 204 writes the condition information along with one or two pieces of the recordation control information RCI to the DVD 400a via the drive unit 207.

Here, specific description is given to how to generate an encryption key KCK. Here, it is assumed that the common secret information GS and the medium identification information MID, and the device secret information DS have been acquired.

In this case, the encryption key generating unit 204 generates an encryption key KCK by concatenating bits of the common secret information GS, the medium identification information MID, and the device secret information DS in the stated order.

$KCK = GS\|MID\|DS,$ where $\|$ is an operator for concatenating bit strings.

In the above description, the encryption key KCK is generated through bit concatenation. Yet, the arithmetic operation used to generate an encryption key KCK is not limited to this specific example. In another example, the encryption key generating unit 204 may generate an encryption key KCK by performing any other operation on the acquired pieces of information (i.e. the common secret information GS, the medium identification information MID, and the device secret information DS). Examples of such an operation include addition, multiplication, and exclusive-OR.

Also, in the above description, the encrypted key KCK is generated by using only one type of arithmetic operation, i.e. bit concatenation. Yet, the number of types of the arithmetic operation used to generate an encryption key KCK is not limited to one as in this specific example. In another example, the encryption key generating unit 204 may generate an encryption key KCK by using two or more types of arithmetic operation on the acquired pieces of information (i.e. the common secret information GS, the medium identification information MID, and the device secret information DS), such as KCK=GS +MIC×DS.

(8) Encryption Unit 205

The encryption unit 205 receives the content key CK from the content key generating unit 202, and the encryption key KCK from the encryption content key generating unit 204.

Next, the encryption unit 205 applies an encryption algorithm El to the received content key CK to generate an encrypted content key ECK, and writes the generated encrypted content key ECK to the DVD 400a via the drive unit 207.

The encryption algorithm El is, for example, an algorithm based on DES (Data Encryption Standard).

Note in the case where two encryption keys are received, the encryption algorithm E1 is applied to the content key separately using each encryption key, so that there are generated two encrypted content keys, which is equal in number to the encryption keys. The encryption unit 205 then writes the thus generated two encrypted content keys to the DVD 400a.

(9) Encryption Unit 206

The encryption unit 206 receives a content from the server 100 via the Internet 20 and the communications unit 201. The content received herein is the one identified by the transmitted content ID. In addition, the encryption unit 206 receives the content key CK from the content key generating unit 202.

Next, the encryption unit 206 applies an encryption algorithm E2 to the received content using the received content key CK to generate an encrypted content ECNT, and then writes the generated encrypted content ECNT to the DVD 400a via the drive unit 207.

The encryption algorithm E2 is, for example, an algorithm based on DES.

(10) Drive Unit 207

The drive unit 207 reads or writes various kinds of information from or to the DVD 400a under the control by the control unit 203, the encryption key generating unit 204, the encryption unit 205, and the encryption unit 206.

1.5 DVD Player 300a

Figure 9:
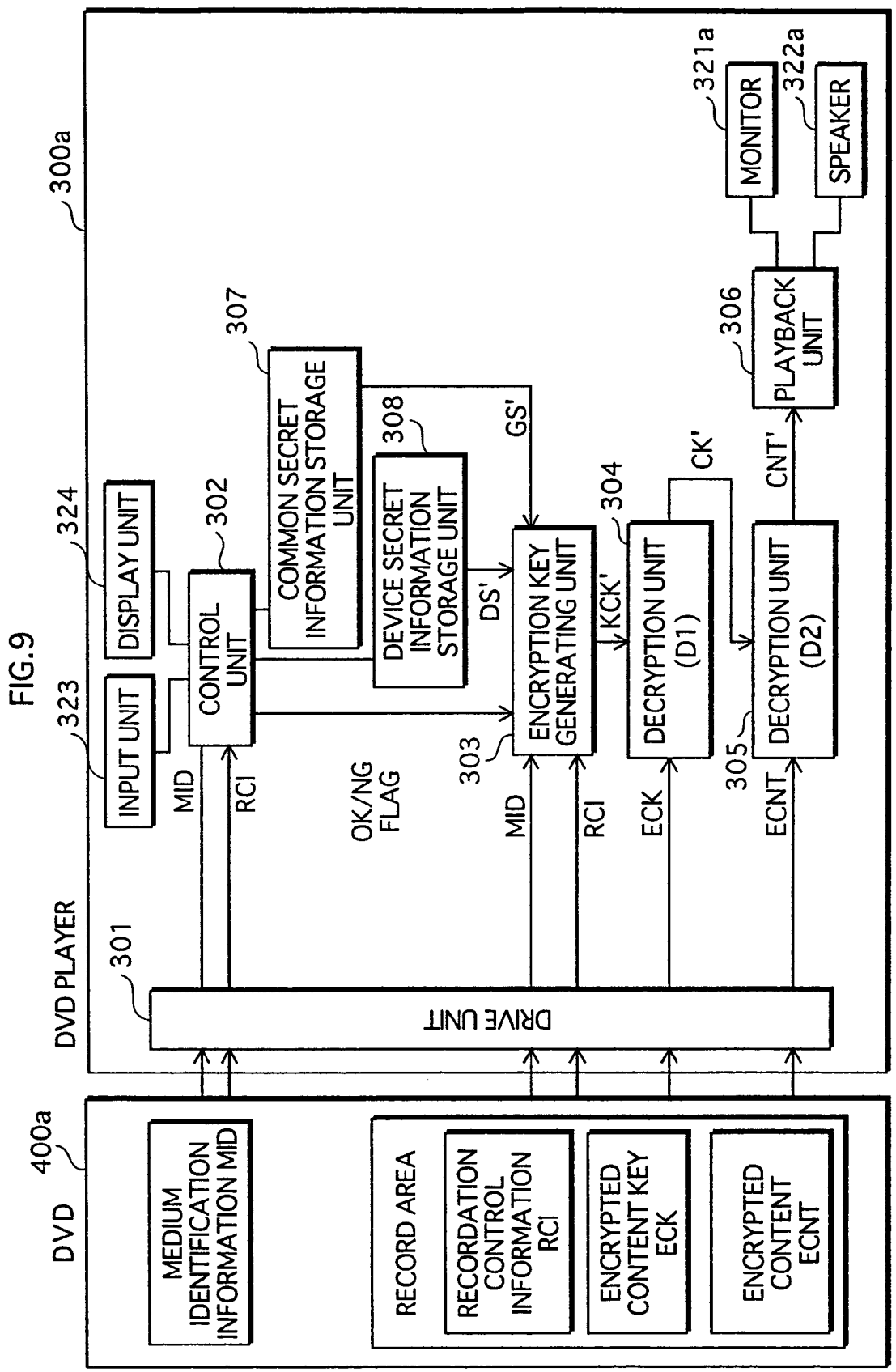

As shown in FIG. 9, the DVD player 300a is composed of a drive unit 301, a control unit 302, an encryption key generating unit 303, a decryption unit 304, a decryption unit 305, a playback unit 306, a common secret information storage unit 307, a device secret information storage unit 308, a monitor 321a, a speaker 322a, an input unit 323, and a display unit 324.

Similarly to the DVD recorder 200a, the DVD player 300a is a computer system composed generally of a microprocessor, ROM, and RAM. The RAM stores a computer program. The DVD player 300a performs part of its function by the microprocessor operating according to the computer program.

(1) Common Secret Information Storage Unit 307 and Device Secret Information Storage Unit 308

The common secret information storage unit 307 prestores common secret information GS' so to prohibit access from any unit or device other then the control unit 302 and the encryption key generating unit 303. The common secret information GS' is secret information that is commonly stored in all the devices belong to the above-mentioned group. The common secret information GS and the common secret information GS' are equal to each other.

The common secret information storage unit 308 prestores device secret information DS' that is unique to the DVD player 300a so as to prohibit access from any unit or device other than the control unit 302 and the encryption key generating unit 303.

(2) Drive Unit 301

Under the control of the control unit 302, the encryption key generating unit 303, and the decryption units 304 and 305, the drive unit 301 reads various kinds of information from the DVD 400a and outputs the read information to the control unit 302, the encryption key generating unit 303, and the decryption units 304 and 305.

(3) Control Unit 302

The control unit 302 reads the condition information and one or two pieces of the recordation control information RCI from the DVD 400a via the drive unit 301.

On reading the recordation control information RCI from the DVD 400a, the control unit 302 extracts a group dependency flag GFlag, a medium dependency flag MFlag, a device dependency flag DFlag, and a user dependency flag UFlag from the read recordation control information RCI.

Next, the control unit 302 judges whether the group dependency flag GFlag is set to "1" or "0". Judging that the flag is set to "1", the control unit 302 attempts to acquire the common secret information GS'. To be more specific, the control unit 302 attempts to read the common secret information GS' from the common secret information storage unit 307. Since the DVD player 300a is provided with the common secret information storage unit 307, the common secret information GS' is surely acquired. However, in the case of a device without the common secret information storage unit 307, the common secret information GS' is not acquired. Failing to acquire the common secret information GS', the control unit 302 generates an NG flag indicating that no further processing is to be performed regarding the content, and terminates the processing regarding the content.

Next, the control unit 302 judges whether the medium dependency flag MFlag is set to "1" or "0". Judging that the flag is set to "1", the control unit 302 attempts to acquire the medium identification information MID. To be more specific, the control unit 302 attempts to read the medium identification information MID from the DVD 400a via the drive unit 301. Since the DVD 400a has the medium identification information MID recorded thereon, the medium identification information MID is surely acquired. However, in the case where a recording medium having no medium identification information MID is mounted on the DVD player 300a, the medium identification information MID is not acquired. Failing to acquire the medium identification information MID, the control unit 302 generates an NG flag, and terminates the processing regarding the content.

Next, the control unit 302 judges whether the device dependency flag DFlag is set to "1" or "0". Judging that the flag is set to "1", the control unit 302 attempts to acquire the device secret information DS'. To be more specific, the control unit 302 attempts to read the device secret information DS' from the device secret information storage unit 308. Since the DVD player 300a is provided with the device secret information storage unit 308, the device secret information DS' is surely acquired. However, in the case of a device without the device secret information storage unit 308, the device secret information DS' is not acquired. Failing to acquire the device secret information DS', the control unit 302 generates an NG flag and terminates the processing regarding the content.

Next, the control unit 302 judges whether the user dependency flag UFlag is set to "1" or "0". Judging that the flag is set to "1", the control unit 302 attempts to acquire user secret information. To be more specific, the control unit 302 receives via the input unit 323 a string of a plurality of numeric digits that is inputted by the user. As described above, the user secret information is composed according to a predetermined configuration. Here, the control unit 302 judges whether the received string satisfies the predetermined configuration. Judging that the predetermined configuration is not satisfied, the control unit 302 regards that the user secret information is not acquired. Accordingly, the control unit 302 generates an NG flag and terminates the processing regarding the content. On the other hand, judging that the predetermined configuration is satisfied, the control unit 302 regards the received string as the user secret information.

As described above, the control unit 302 attempts to acquire information corresponding to each flag that is set to "1". When failing to acquire corresponding information, the control unit 302 generates an NG flag and otherwise generates an OK flag indicating that processing regarding the content is to be further performed.

Next, the control unit 302 outputs the thus generated NG flag or OK flag to the encryption key generating unit 303. Note in the case where two pieces of recordation control information RCI are read along with the condition information that shows either the "ten-time use" condition or the "six-month use" condition, the control unit 302 judges whether the usage of the content currently being processed is the eleventh time or thereafter, or whether six months have passed since the purchase. The judgment is made with reference to internally stored information showing how many times the content has been used and the date of the very first usage of the content.

Judging that the use of the content currently processed is the tenth time or less, or that the six-month period has not passed, the control unit 302 uses the first out of the two pieces of recordation control information RCI. Further, the control unit 302 instructs the encryption key generating unit 303 to use the first piece of the recordation control information RCI, and the decryption unit 304 to use the first one of two encrypted content keys.

On the other hand, judging that the use of the content currently processed is the eleventh time or thereafter, or that the six-month period has passed, the control unit 302 uses the second out of the two pieces of the recordation control information RCI. Further, the control unit 302 instructs the encryption key generating unit 303 to use the second, i.e. the last piece of the recordation control information RCI, and the decryption unit 304 to use the second, i.e., the last one of two encrypted content keys.

Here, the control unit 302 uses the recordation control information RCI in the above-described manner.

(4) Encryption Key Generating Unit 303

The encryption key generating unit 303 reads one or two pieces of the recordation control information RCI from the DVD 400a via the drive unit 301, receives an NG flag or an OK flag from the control unit 302. Further, the encryption key generating unit 303 may receive an instruction specifying which of the two pieces of recordation control information RCI is to be used. In the case of receiving such an instruction, the encryption key generating unit 303 uses the specified piece of the recordation control information RCI for the processing performed thereafter.

On receiving an NG flag, the encryption key generating unit 303 terminates the processing without generating an encryption key. On receiving an OK flag, on the other hand, the encryption key generating unit 303 generates an encryption key in the following manner.

Generation of Encryption Key

The encryption key generating unit 303 reads the common secret information GS' from the common secret information storage unit 307 when the group dependency flag is set to "1". When the medium dependency flag MFlag is set to "1", the encryption key generating unit 303 acquires the medium identification information MID from the DVD 400a via the drive unit 301. When the device dependency flag DFlag is set to "1", the encryption key generating unit 303 reads the device secret information DS' from the device secret information storage unit 308. Further, when the user dependency flag UFlag is set to "1", the encryption key generating unit 303 acquires the user secret information from the control unit 302.

Next, the encryption key generating unit 303 concatenates bits of each piece of the acquired information in the order stated above, and designates the concatenated information as a decryption key KCK'. Note where only one piece of information is adopted, the information is directly designated as the decryption key KCK'.

In the above description, the decryption key KCK' is generated through bit concatenation. Yet, similarly to the description given in relation to the encryption key generating unit 204, the arithmetic operation used to generate a decryption key KCK' is not limited to this specific example and may be any other arithmetic operation. It should be noted, however, the encryption key generating unit 204 and the decryption key generating unit 303 must use the same arithmetic operation.

Next, the encryption key generating unit 303 outputs the generated decryption key KCK' to the decryption unit 304.

(5) Decryption Unit 304

In the case where there is a plurality of encryption keys recorded on the DVD 400a, the decryption unit 304 receives from the control unit 302, an instruction specifying which of the encryption keys is to be used.

The decryption unit 304 receives a decryption key KCK' from the encrypted key generating unit 303. Further, the decryption unit 304 reads the encrypted content key ECK from the DVD 400a via the drive unit 301. Here, when the instruction as above has been received, the decryption unit 304 reads the specified one of the encrypted content keys.

Next, the decryption unit 304 applies a decryption algorithm D1 to the read encrypted content key ECK using the received decryption key KCK' to generate a content key CK', and outputs the generated content key CK' to the decryption unit 305.

The decryption algorithm D1 is an algorithm for decrypting ciphertext generated through the encryption algorithm E1, and is based on DES, for example.

(6) Decryption Unit 305

The decryption unit 305 reads an encrypted content ECNT from the DVD 400a via the drive unit 301, and receives the content key CK' from the decryption unit 304.

Next, the decryption unit 305 applies a decryption algorithm D2 to the read encrypted content ECNT using the received content key CK' to generate a content CNT', and outputs the generated content CNT' to playback unit 306.

The decryption algorithm D2 is an algorithm for decrypting ciphertext generated through the encryption algorithm E2, and is based on DES, for example.

(7) Playback Unit 306, Monitor 321a, and Speaker 322a

The playback unit 306 receives the content CNT' from the decryption unit 305, and decompression-decodes the received content CNT' to generate audio information and video information. The playback unit 306 then separately converts the generated audio information and video information to analog audio and video signals, and outputs the analog audio signal to the speaker 322a and the analog video signal to the monitor 321a.

The monitor 321a receives the video signal and displays resulting image sequence.

The speaker 322a receives the audio signal and outputs resulting sounds.

(8) Input Unit 323 and Display Unit 324

The input unit 323 receives various kinds of instructions and data in response to user operations, and outputs the received instructions and data to the control unit 302.

The display unit 324 displays various kinds of information under the control of the control unit 302.

1.6 Personal Computer 200b

Figure 10:
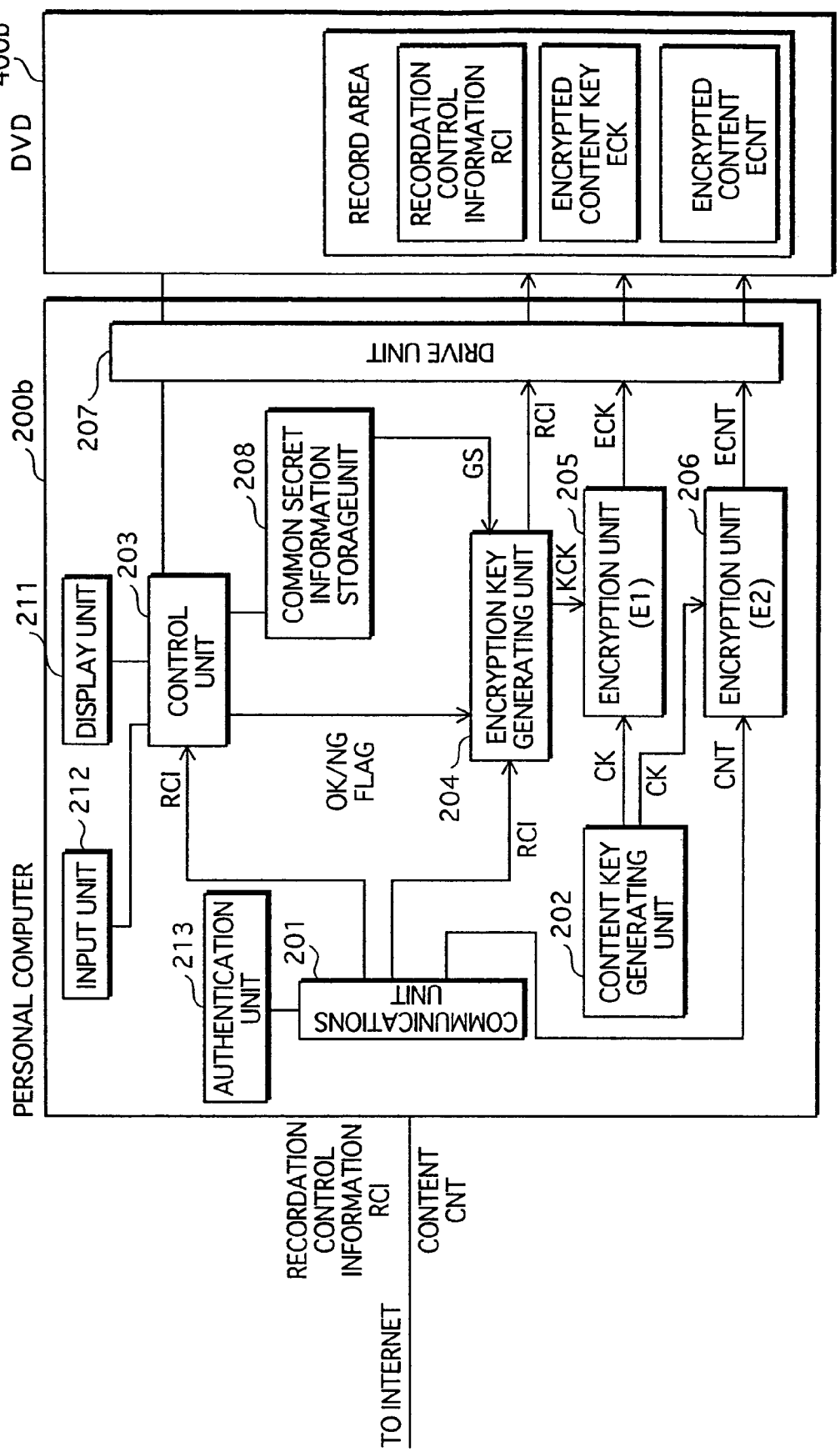
FIG. 10 is a block diagram showing the structure of a personal computer 200b along with the data structure of a DVD 400b.

The personal computer 200b is similar to the DVD recorder 200a in structure. As shown in FIG. 10, the personal computer 200b is composed of a communications unit 201, a content key generating unit 202, a control unit 203, an encryption key generating unit 204, an encryption unit 205, an encryption unit 206, a drive unit 207, a common secret information storage unit 208, a display unit 211, an input unit 212, and an authentication unit 213.

The personal computer 200b is specifically a computer system composed generally of a microprocessor, ROM, and RAM. The RAM stores a computer program. The personal computer 200b performs part of its function by the microprocessor operating according to the computer program.

The personal computer 200b differs from the DVD recorder 200a mainly in that the device secret information storage unit 209 is not provided. The other components are similar to a corresponding component of the DVD recorder 200a.

1.7 DVD 400b

Similarly to the DVD 400a, the DVD 400b is a recordable and portable recording medium such as DVD-RAM. As in an example shown in FIG. 10, the DVD 400b has a recordable area in which various kinds of information may be recorded. The personal computer 200b writes to the recordable area, the recordation control information RCI, the encrypted content key ECK, and the encrypted content ECNT.

The DVD 400b differs from the DVD 400a in that no medium identification information MID is recorded.

1.8 DVD Player 300b

Figure 11:
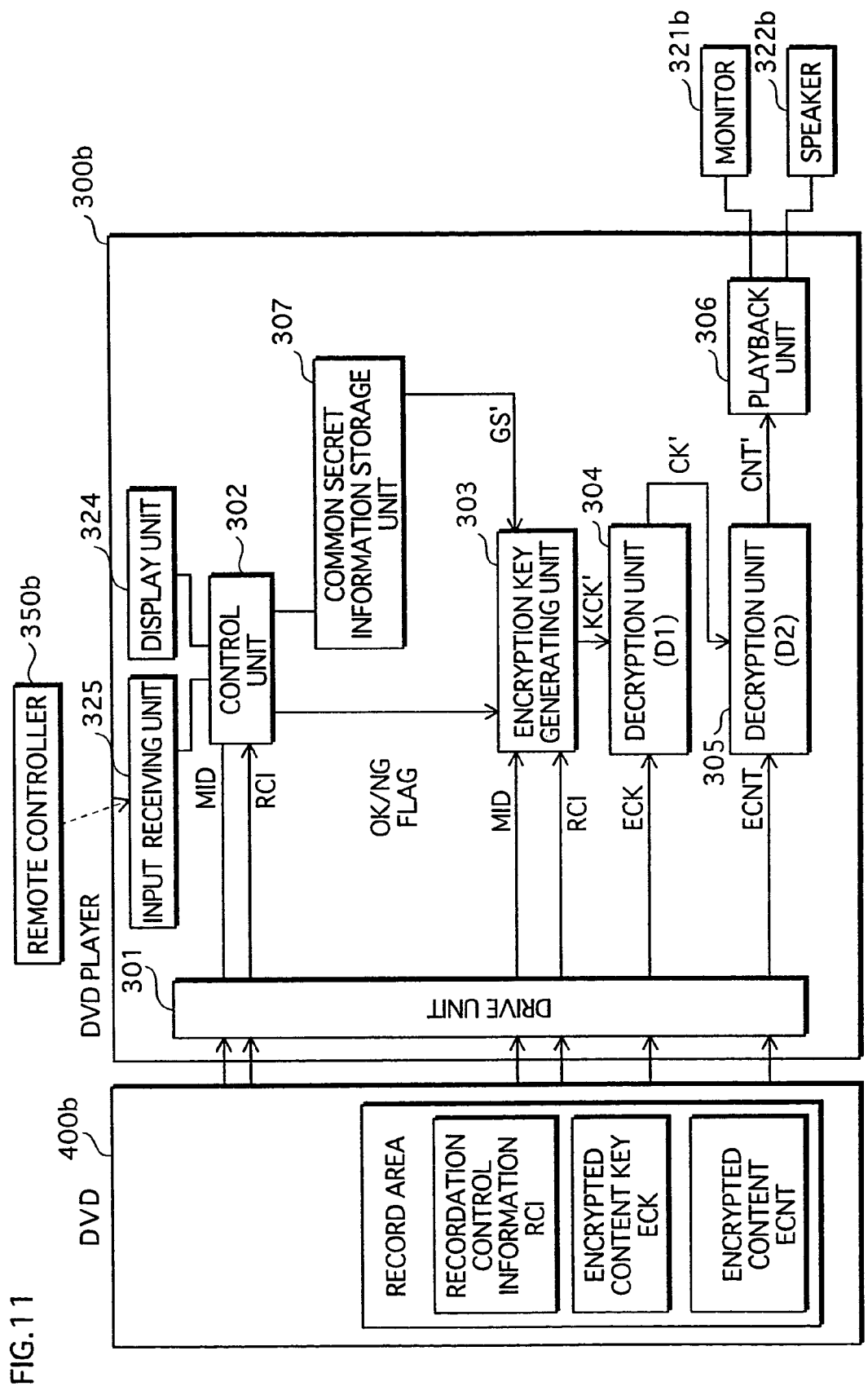
FIG. 11 is a block diagram showing the structure of a DVD player 300b along with the data structure of the DVD 400b.

The DVD player 300b is similar to the DVD player 300a in structure. As shown in FIG. 11, the DVD player 300b is composed of a drive unit 301, a control unit 302, an encryption key generating unit 303, a decryption unit 304, a decryption unit 305, a playback unit 306, a common secret information storage unit 307, a display unit 324, and an input receiving unit 325. In addition, the DVD player 300b is connected to the monitor 321b and a speaker 322b.

The DVD player 300b is a computer system composed generally of a microprocessor, ROM, and RAM. The RAM stores a computer program. The DVD player 300b performs part of its function by the microprocessor operating according to the computer program.

The DVD player 300b differs from the DVD player 300a mainly in that the device secret information storage unit 308 is not provided.

1.9 DVD Recorder/Player 200c and the DVD 400c

The DVD recorder/player 200c is a device that is composed of components similar to those of both the DVD recorder 200a and the DVD player 300c.

Figure 12:
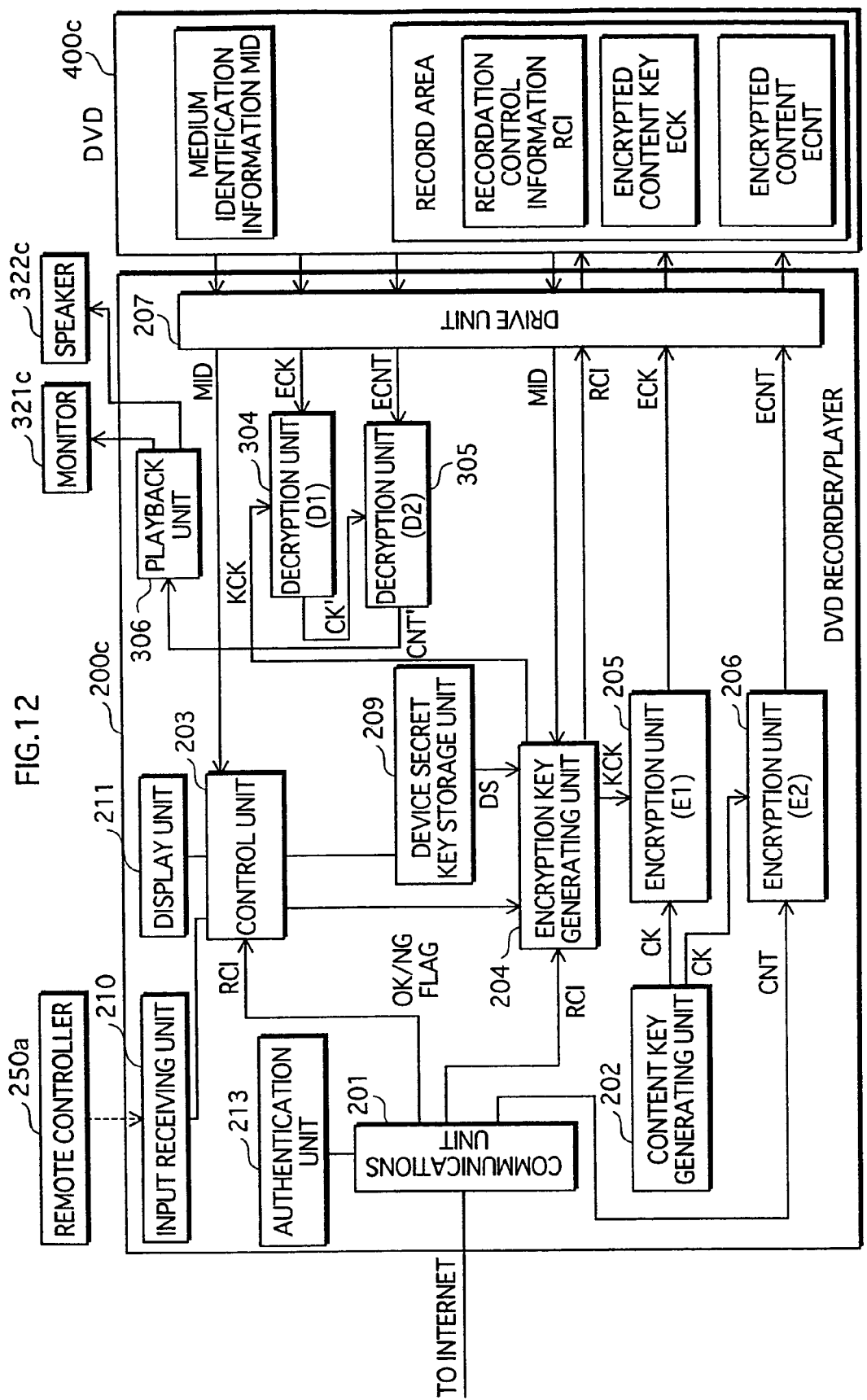
FIG. 12 is a block diagram showing the structure of a DVD recorder/player 200c along with the data structure of a DVD 400c.

As shown in FIG. 12, the DVD recorder/player 200c is composed of a communications unit 201, a content key generating unit 202, a control unit 203, an encryption key generating unit 204, an encryption unit 205, an encryption unit 206, a drive unit 207, a device secret information storage unit 209, a input receiving unit 210, an authentication unit 213, a decryption unit 304, a decryption unit 305, and a playback unit 306. In addition, the DVD recorder/player 200c is connected to the monitor 321c and a speaker 322c.

The DVD recorder/player 200c is specifically a computer system composed generally of a microprocessor, ROM, and RAM. The RAM stores a computer program. The DVD recorder/player 200c performs part of its function by the microprocessor operating according to the computer program.

The DVD recorder/player 200c differs from the DVD recorder 200a and the DVD player 300a mainly in that the common secret information storage unit is not provided.

The DVD 400c is similar to the DVD 400a in structure.

1.10 Operations of Digital Work Protection System 10

Description is now given to the operations performed by the digital work protection system 10 through processing to write a content to a recording medium and to playback the content.

(1) Operations Performed for Writing Content

Figure 13:
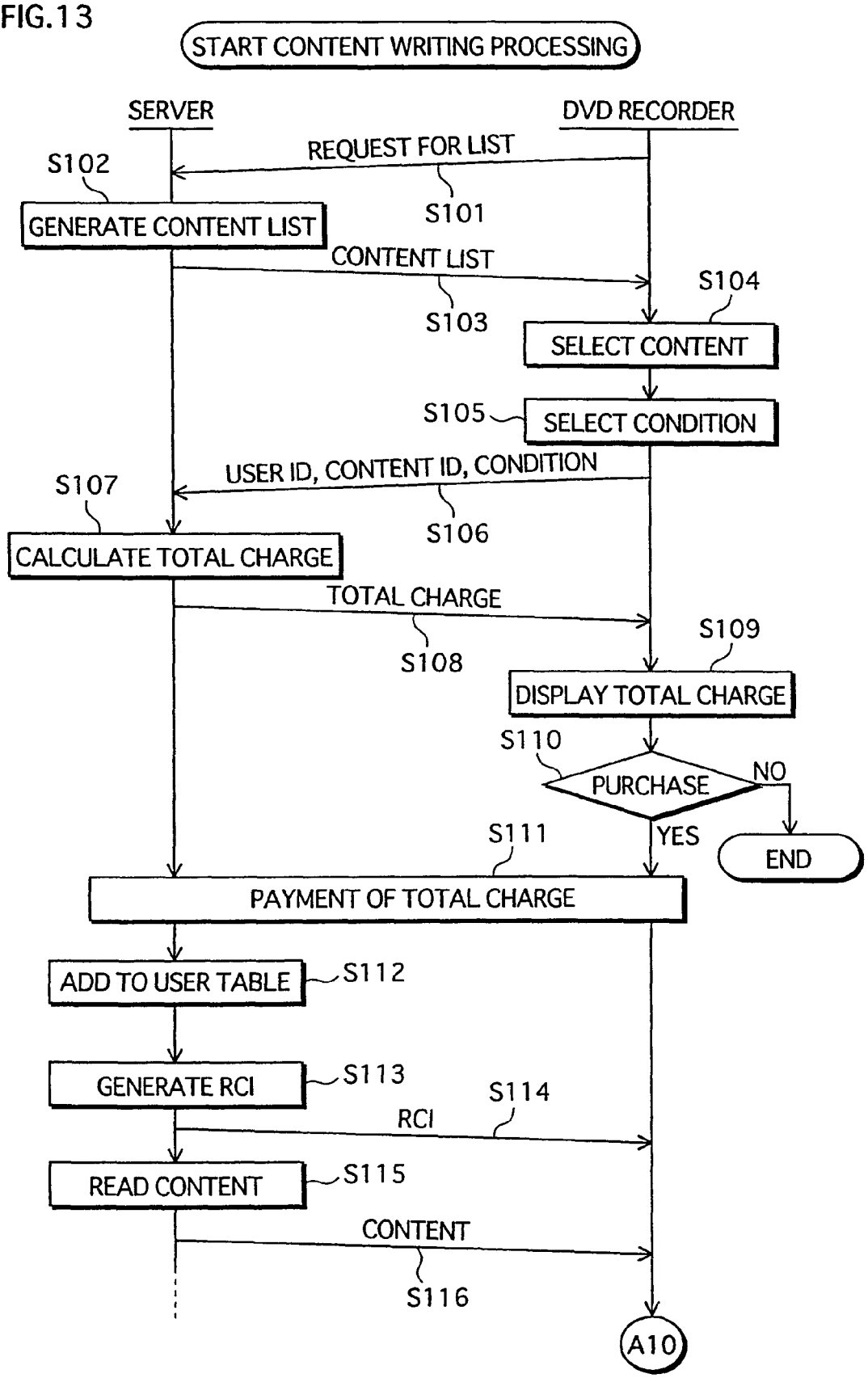
FIG. 13 is a flowchart showing processing for writing a content, and to be continued to FIG. 14.
Figure 14:
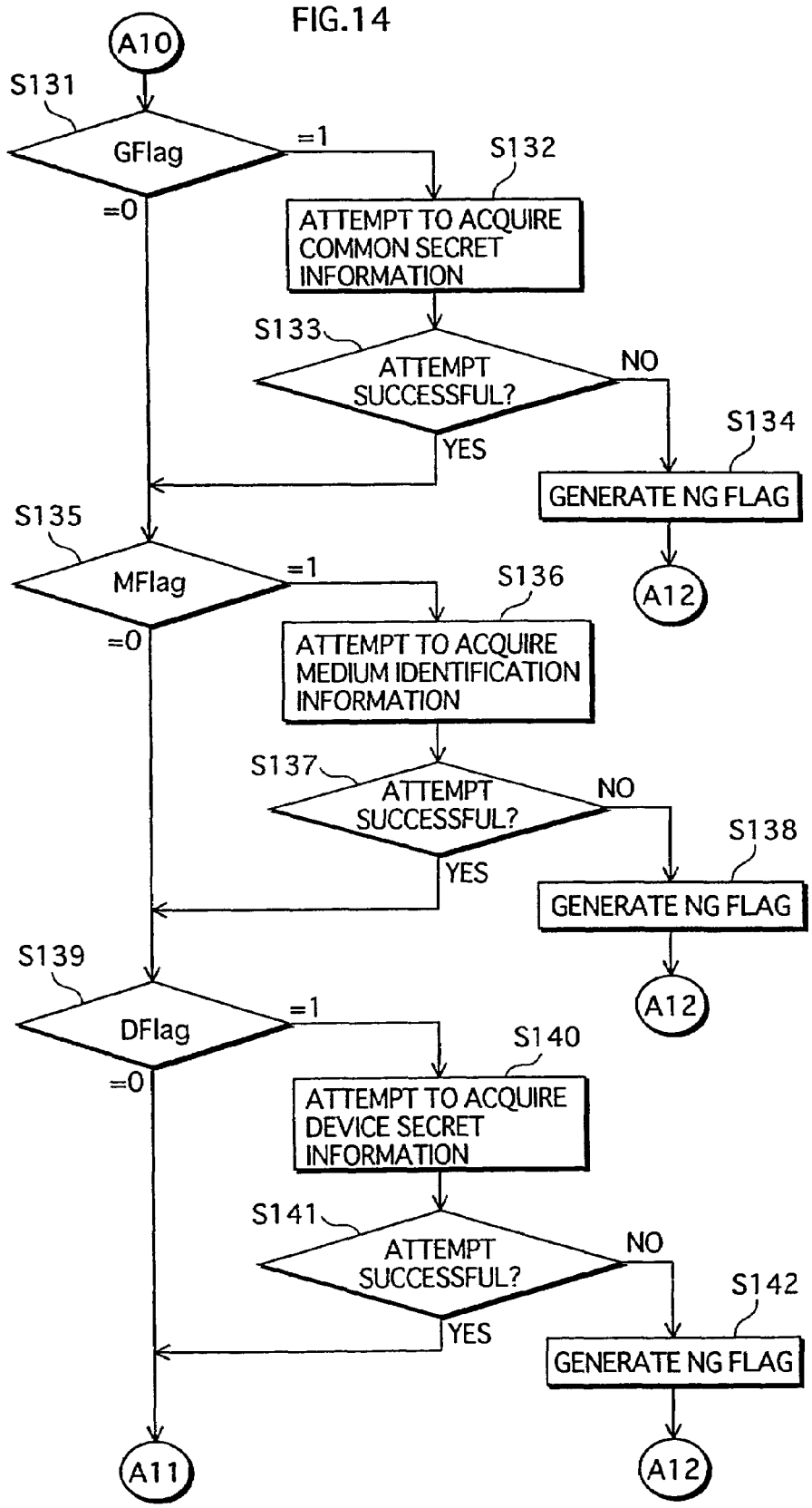
FIG. 14 is the flowchart showing the processing for writing a content, and to be continued to FIG. 15.
Figure 15:
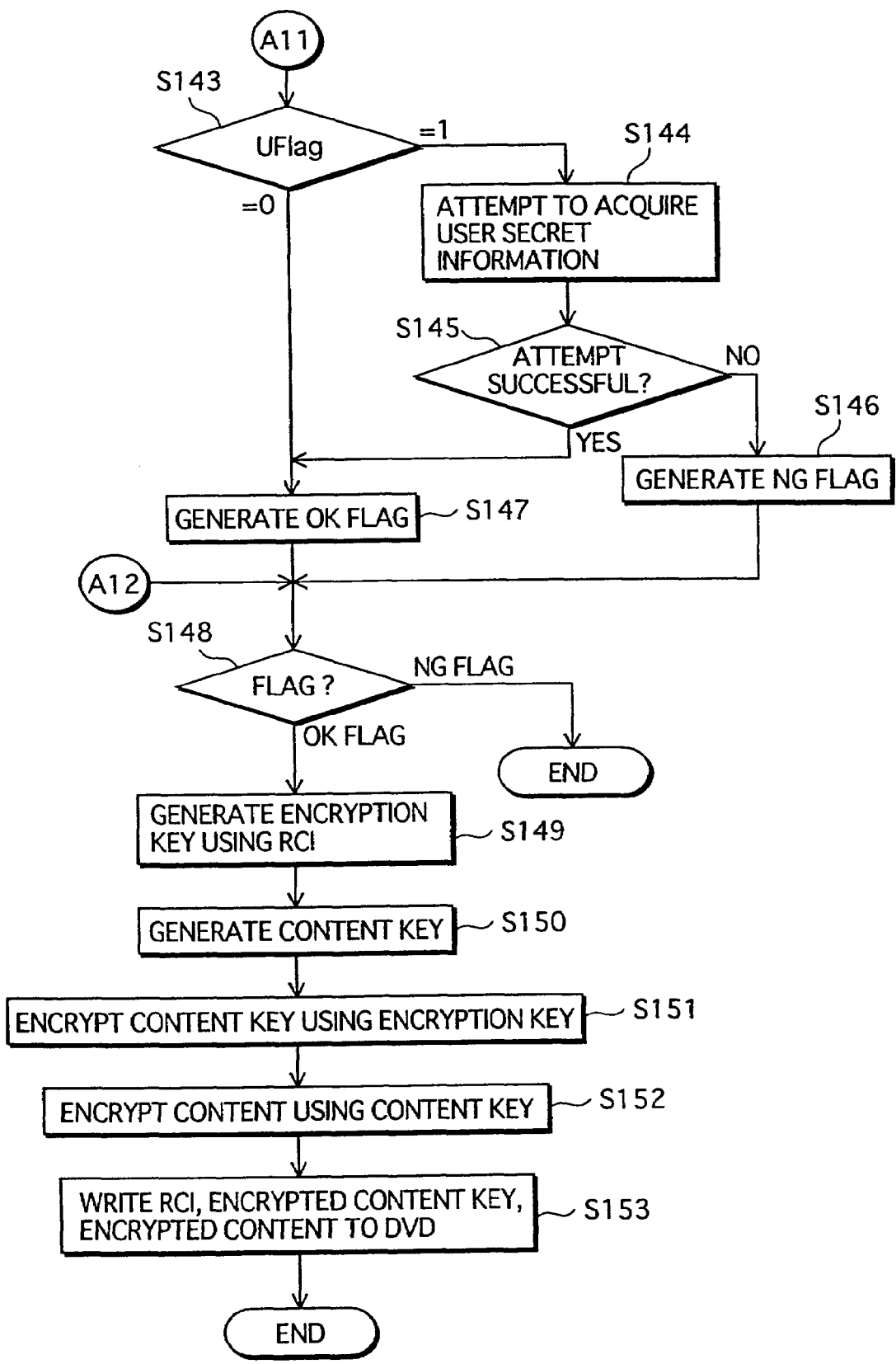
FIG. 15 is the flowchart showing the processing for writing a content, and continued from FIG. 14.

First, description is given, with reference to a flowchart shown in FIGS. 13-15, to the operations performed for writing a content.

The control unit 203 of the DVD recorder 200a transmits a request for a list of contents to the server 100 via the communications unit 201 and the Internet 20. In response, the control unit 104 of the server 100 receives the request via the Internet 20 and the communications unit 105. (step S101) Next, the control unit 104 reads all the pieces of content feature information from the content table 141 stored in the information storage unit 101. The control unit 104 then generates a list of contents using the read content feature information (step S102), and transmits the generated list of contents to the DVD recorder 200a via the communications unit 105 and the Internet 20 (step S103).

Here, a user makes an input using the remote controller 250a to select one of the contents shown in the list, so that the control unit 203 receives via the input receiving unit 210 a content ID identifying the selected content (step S104). The user further inputs, using the remote controller 250a, purchase conditions that the user desires, so that the control unit 203 receives the purchase conditions via the input receiving unit 210 (step S105). The control unit 203 then transmits a user ID, the content ID, and the purchase conditions to the server 100 (step S106).

In response, the control unit 104 calculates a total charge (step S107), and transmits information showing the calculated total charge to the DVD recorder 200a (step S108). In response, the display unit 211 displays the total charge shown by the received information (step S109). Here, using the remote controller 250a, the user inputs information showing either agreement or disagreement to purchase the content, so that the control unit 203 receives the inputted information via the input receiving unit 210. When receiving information showing disagreement (step S110), the control unit 203 terminates the processing regarding the content. On the other hand, when receiving the information showing agreement (step S110), the control unit 203 performs payment processing in conjunction with the server 100 so as to receive the total charge (step S111).

Next, the control unit 104 generates user purchase information that is composed of the user ID, the content ID, an dependency information ID, the condition information, the date, and the total charge, and writes to add the generated user purchase information to the user table 151 (step S112).

Next, the control unit 104 generates recordation control information RCI that is composed of a group dependency flag GFlag, a medium dependency flag MFlag, a device dependency flag DFlag, and a user dependency flag UFlag (step S113), and transmits the generated recordation control information RCI to the DVD recorder 200a via the communications unit 105 and the Internet 20 (step S114).

Next, the control unit 104 reads from the information storage unit 101, a content identified by the received content ID (step S115), and transmits the read content to the DVD recorder 200a via the communications unit 105 and the Internet 20 (step S116).

Next, the control unit 203 judges whether the group dependency flag GFlag is set to "1". When judging that the flag is set to "1" (step S131), the control unit 203 attempts to acquire the common secret information GS (step S132). When failing to acquire the common secret information GS (step S133), the control unit 203 generates an NG flag (step S134), and terminates the processing regarding the content.

On the other hand, when judging that the group dependency flag GFlag is set to "0" (step S131) or when successfully acquiring the common secret information GS (step S133), the control unit 203 judges whether the medium dependency flag MFlag is set to "1" or "0". When judging that the flag is set to "1" (step S135), the control unit 203 attempts to acquire the medium identification information MID (step S136). When failing to acquire the medium identification information MID (step S137), the control unit 203 generates an NG flag (step S138) and terminates the processing regarding the content.

On the other hand, when judging that the medium dependency flag MFlag is set to "0" (step S135) or when successfully acquiring the medium identification information MID (step S137), the control unit 203 judges whether the device dependency flag DFlag is set to "1" or "0". When judging that the device dependency flag is set to "1" (step S139), the control unit 203 attempts to acquire the device secret information DS (step S140). When failing to acquire the device secret information DS (step S141), the control unit 203 generates an NG flag (step S142) and terminates the processing regarding the content.

On the other hand, when judging that the device dependency flag DFlag is set to "0" (step S139) or when the device secret information DS is successfully acquired (step S141), the control unit 203 judges whether the user dependency flag UFlag is set to "1" or "0". When judging that the flag is set to "1" (step S143), the control unit 203 attempts to acquire the user secret information (step S144). When failing to acquire the user secret information (step S145), the control unit 203 generates an NG flag (step S146) and terminates the processing regarding the content.

On the other hand, when judging that the user dependency flag UFlag is set to "0" (step S143) or when the user secret information is successfully acquired (step S145), the control unit 203 generates an OK flag (step S147).

On generation of the NG flag (step S148), the control unit 203 terminates the processing regarding the content. On generation of the OK flag (step S148), the following operations are performed: the encryption key generating unit 204 generates an encryption key based on the recordation control information RCI (step S149); the content key generating unit 202 generates a content key CK (step S150); the encryption unit 205 applies the encryption algorithm E1 to the content key CK using the encryption key KCK to generate an encrypted content key ECK (step S151); the encryption unit 206 applies the encryption algorithm E2 to the content using the content key CK to generate an encrypted content ECNT (step S152); the encrypted key generating unit 204 writes the recordation control information RCI to the DVD 400a via the drive unit 207, the encryption unit 205 writes the encrypted content key ECK to the DVD 400a via the drive unit 207, and the encryption unit 206 writes the encrypted content ECNT to the DVD 400a via the drive unit 207 (step S153).

(2) Operations Performed for Playback of Content

Figure 16:
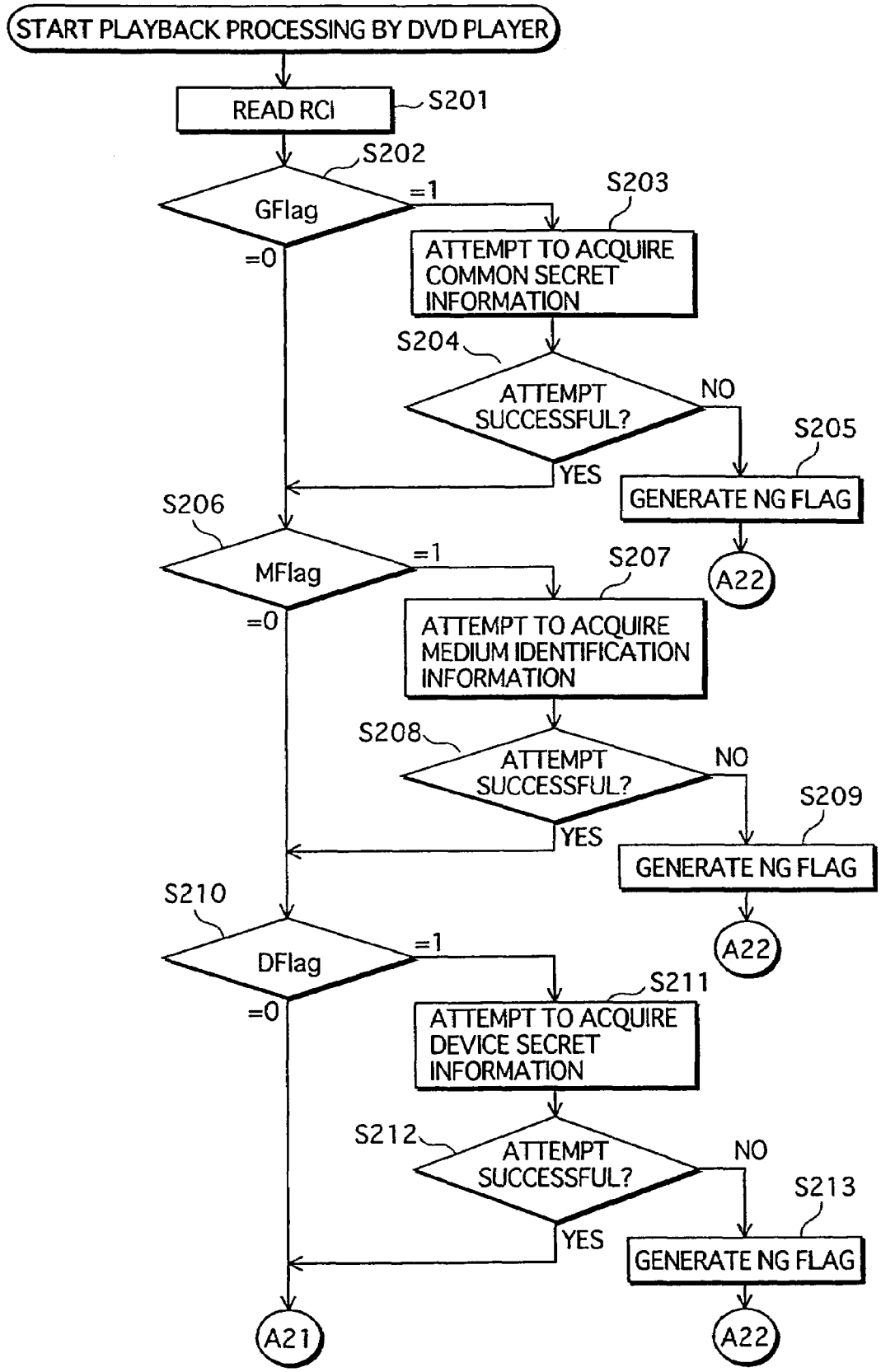
FIG. 16 is a flowchart showing processing for playing back a content, and to be continued to FIG. 17.

Next, description is given, with reference to a flowchart shown in FIGS. 16-17, to the operations performed for playback of a content.

The control unit 302 reads recordation control information RCI from the DVD 400a via the drive unit 301, and extracts from the read recordation control information RCI, a group dependency flag GFlag, a medium dependency flag MFlag, a device dependency flag DFlag, and a user dependency flag UFlag (step S201).

Next, the control unit 302 judges whether the group dependency flag GFlag is set to "1". When judging that the flag is set to "1" (step S202), the control unit 302 attempts to acquire the common secret information GS' (step S203). When failing to acquire the common secret information GS' (step S204), the control unit 302 generates an NG flag (step S205), and terminates the processing regarding the content.

On the other hand, when judging that the group dependency flag GFlag is set to "0" (step S202) or when successfully acquiring the common secret information GS' (step S204), the control unit 302 judges whether the medium dependency flag MFlag is set to "1" or "0". When judging that the flag is set to "1" (step S206), the control unit 302 attempts to acquire the medium identification information MID (step S207). When failing to acquire the medium identification information MID (step S208), the control unit 302 generates an NG flag (step S209) and terminates the processing regarding the content.

On the other hand, when judging that the medium dependency flag MFlag is set to "0" (step S206) or when successfully acquiring the medium identification information MID (step S208), the control unit 302 judges whether the device dependency flag DFlag is set to "1" or "0". When judging that the device dependency flag is set to "1" (step S210), the control unit 302 attempts to acquire the device secret information DS' (step S211). When failing to acquire the device secret information DS' (step S212), the control unit 302 generates an NG flag (step S213) and terminates the processing regarding the content.

On the other hand, when judging that the device dependency flag DFlag is set to "0" (step S210) or when the device secret information DS' is successfully acquired (step S212), the control unit 302 judges whether the user dependency flag UFlag is set to "1" or "0". When judging that the flag is set to "1" (step S214), the control unit 302 attempts to acquire the user secret information (step S215). When failing to acquire the user secret information (step S216), the control unit 302 generates an NG flag (step S217) and terminates the processing regarding the content.

On the other hand, when judging that the user dependency flag UFlag is set to "0" (step S214) or when the user secret information is successfully acquired (step S216), the control unit 302 generates an OK flag (step S218).

On generation of the NG flag (step S219), the control unit 302 terminates the processing regarding the content. On generation of the OK flag (step S219), on the other hand, the encryption key generating unit 303 generates a decryption key KCK' based on the recordation control information RCI (step S220).

The decryption unit 304 receives the decryption key KCK' from the encryption key generating unit 303, and reads the encrypted content key ECK from the DVD 400a via the drive unit 301 (step S221), and applies the decryption algorithm D1 to the encrypted content key ECK to generate a content key CK' (step S222).

Next, the decryption unit 305 reads the encrypted content ECNT from the DVD 400a via the drive unit 301, and receives the content key CK' from the decryption unit 304 (step S223). The decryption unit 305 then applies the decryption algorithm D2 to the read encrypted content ECNT using the received content key CK' to generate a content CNT' (step S224).

The playback unit 306 receives the content CNT' from the decryption unit 305, and decompression-decodes the received content CNT' to generate audio information and video information. The playback unit 306 then separately converts the generated audio information and video information to analog audio and video signals, and outputs the analog audio signal to the speaker 322a and the analog video signal to the monitor 321a (step S225)

2. Conclusion

As has been described, in the digital work protection system 10, the DVD recorder 200a confirms whether the DVD recorder 200a and the DVD 400a have all information required by recordation control information RCI that is distributed by a content distributor, and then accordingly decides whether to record a content CNT to the DVD recorder 400a. On deciding to record the content CNT, the DVD recorder 200a generates an encryption key KCK using all the information required by the recordation control information RCI, encrypts a content key CK using the generated encryption key KCK to generate an encrypted content key ECK, encrypts the content CNT using the content key CK to generate an encrypted content ECNT, and then records the recordation control information RCI, the encrypted content key ECK, and the encrypted content ECNT to the DVD 400a.

Further, the DVD player 300a reads recordation control information RCI from the DVD 400a, and confirms whether the DVD player 300a and the DVD 400a have all the information required by the read recordation control information RCI, and then accordingly decides whether to decrypt the encrypted content ECNT. On deciding to decrypt the encrypted content ECNT, the DVD player 300a generates a decryption key KCK' using all the information defied by the read recordation control information RCI, reads the encrypted content key ECK and the encrypted content ECNT from the DVD 400a, decrypts the encrypted content key ECK using the decryption key KCK' to generate a content key CK', decrypts the encrypted content ECNT using the content key CK' to generate a content CNT', and then plays back the generated content CNT'.

With this arrangement, in order for the DVD player 300a to play back a content CNT recorded on the DVD 400a, all the information required by recordation control information RCI that is distributed from a content distributor needs to be identical between the DVD recorder 200a and the DVD player 300a as well as between the DVD 400a mounted on the DVD recorder 200a and the DVD 400a mounted on the DVD player 300a. Otherwise, the DVD player 300a fails to acquire a correct encryption key KCK that is generated by the DVD recorder 200a, so that the content CNT is not properly decrypted.

To be more specific, suppose that recordation control information RCI distributed from a content distributor is composed of GFlag=1, MFlag=1, DFlag=0, and UFlag=0. In this case, the DVD recorder 200a confirms whether the DVD recorder 200a and the DVD 400a respectively have the common secret information GS and the medium identification information MID that are required by the recordation control information RCI. The DVD recorder 200a then decides whether to record the content CNT to the DVD 400a. Further, when recording the content CNT to the DVD 400a, the DVD recorder 200a generates an encryption key KCK using the common secret information GS and the medium identification information MID.

Consequently, unless all the information (in this example, the common secret information GS and the medium identification information MID) required by recordation control information RCI that is distributed from a content distributor is identical between the DVD recorder 200a and the DVD player 300a as well as between the DVD 400a mounted on the DVD recorder 200a and the DVD 400a mounted on the DVD player 300a, the DVD player 300a fails to acquire a correct encryption key KCK that is generated by the DVD recorder 200a. Without a correct encryption key KCK, the DVD player 300a fails to properly decrypt the content CNT.

That is to say, the encrypted content ECNT recorded on the DVD 400a is:

(a) played back only by a playback device having the common secret information GS that is identical to the one stored in the DVD recorder 200a; and (b) not possibly copied to another recording medium (because the encryption key KCK is generated from the medium identification information that is unique to the DVD 400a, so that it is impossible to acquire a correct encryption key KCK from a recording medium being a copy destination).

This feature is applicable to the case where a content distributor permits playback of contents with playback devices that are owned by users being members of a specific group, and prohibits playback of the contents by other playback devices owned by non-member users. Further, this feature is applicable to the case where the content distributor prohibits backup copying of contents recorded on a portable recording medium.

In order to permit contents to be used in the above usage pattern, the content distributor distributes the recordation control information as shown in FIG. 7.

In another example, suppose that recordation control information RCI distributed from a content distributor is composed of GFlag=0, MFlag=0, DFlag=1, and UFlag=0. In this case, the DVD recorder 200a confirms whether the DVD recorder 200a has the device secret information DS required by the recordation control information RCI, and accordingly decides whether to record a content CNT to the DVD400a. Further, when recording the content CNT to the DVD 400a, the DVD recorder 200a generates from the device secret information DS, an encryption key KCK, which will be used to decrypt an encrypted content key ECK.

Consequently, unless the information (in this example, the device secret information DS) required by recordation control information RCI that is distributed by a content distributor is identical between the DVD recorder 200a and the DVD player 300a, the DVD player 300a fails to acquire a correct encryption key KCK that is generated by the DVD recorder

200*a*. Without a correct encryption key KCK, the DVD player 300*a* fails to properly decrypt the encrypted content ECNT.

That is to say, the encrypted content ECNT recoded on the DVD 400*a* is:

(a) played back only by a playback devices having the device secret information DS that is identical to the one stored in the DVD recorder 200*a*; and (b) duly copied to another recording medium (because the encryption key KCK is generated without the medium identification information that is unique to the DVD 400*a*, so that a correct encryption key KCK is properly acquired from a recording medium being a copy destination).

This feature is applicable to the case where a content distributor permits playback of contents only with playback devices that are used to record the contents, and permits backup copying of contents recorded on a portable recording medium.

In order to permits contents to be used in the above usage pattern, the content distributor distributes the recordation control information RCI as described above.

As has been described, the digital work protection system 10 enables a content distributor to flexibly impose restrictions so as to permit limited playback devices to playback contents recorded on a recording medium simply by distributing suitable recordation control information as exemplary shown in FIG. 7. With this arrangement, the copyright of the content distributor is protected while permitting users to freely use contents within a permitted usage pattern.

That is, a content distributor is allowed to flexibly determine different usage patterns depending on contents to be distributed and/or users of the distributed contents.

3. Modifications

Up to this point, the present invention has been described by way of the above embodiment. The present invention, however, is not limited to the above embodiment, and various modifications as follows are still within the scope of the present invention.

(1) In the above embodiment, each device is structured to prompt the user for a password when the user dependency flag UFlag in recordation control information RCI is set to "1". Yet, the present invention is not limited to such a structure. For example, each device may prompt for the user biometric information such as a fingerprint and an image of an iris that identifies an individual.

Further, personal information such as a password may be recorded on a mobile phone, so that the personal information may be inputted from the mobile phone to the DVD recorder or the DVD player by establishing connection therebetween or via wireless communications.

With this arrangement, no user other than that particular user is permitted to play back a content CNT recorded on the DVD 400*a*.

(2) In addition to the user dependency flag UFlag, the recordation control information RCI may include another flag used to impose further restrictions on permissible users.

In addition, recordation control information RCI may further include another group dependency flag indicating whether to adopt a group range encompassing a different group from the group adopted by the group dependency flag described in the above embodiment.

(3) In the above embodiment, the server 100 transmits a content CNT and recordation control information RCI to the DVD recorder 200*a*, the personal computer 200*b*, and the DVD recorder/player 200*c* via the Internet 20. Yet, the present invention is not limited to such transmission.

The content CNT and the recordation control information RCI may be distributed by way of digital broadcasting, or may be commercially distributed in form of recording mediums such as a CD-ROM and DVD-RAM.

(4) In the above embodiment, the server 100 receives specifications regarding recordation control information RCI from the DVD recorder 200*a* owned by a user, and transmits a content CNT and a corresponding piece of recordation control information RCI after receiving the total charge calculated correspondingly to the recordation control information RCI. Yet, the present invention is not limited thereto.

For example, each content CNT may be associated in advance with a specific piece of recordation control information RCI. In response to a user request for a content CNT, a corresponding piece of recordation control information RCI may be transmitted to the user along with the requested content CNT.

In this case, a recently released content may be associated with recordation control information RCI that imposes stricter restrictions. On the other hand, a content that has been a while after the release may be associated with recordation control information RCI that imposes loosened restrictions.

Further, after receiving recordation control information RCI, the DVD recorder 200*a* may newly receive another piece of recordation control information RCI from the server 100 and use the newly-received recordation control information RCI in the future processing. In this case, the server 100 may perform billing processing to the DVD recorder 200*a* based on the newly-received recordation control information RCI.

For example, the DVD recorder 200*a* first receives a piece of recordation control information RCI that is composed of GFlag=1, MFlag=0, DFlag=0, and UFlag=0. The DVD recorder 200*a* then further receives another piece of recordation control information RCI that is composed of GFlag=1, MFlag=1, DFlag=1, and UFlag=1.

On receiving another piece of recordation control information RCI, the DVD recorder 200*a* is no longer permitted to use the piece of recordation control information RCI that has been received first. Here, it is applicable to delete the first piece of recordation control information RCI.

Further, the DVD recorder 200*a* may occasionally inquire the server 100 of presence of a latest version of recordation control information RCI. When there is a latest version, the DVD recorder 200*a* may receive the latest version of the recordation control information RCI from the server 100 in the above-described manner.

(5) In the above embodiment, the DVD recorder 200*a* pre-stores the common secret information GS and the device secret information DS. Yet, such information may be externally inputted.

For example, it is possible to externally input common secret information GS of another group to the DVD recorder 200*a*, so that the DVD recorder 200*a* is capable of transferring a content CNT to the other group. That is to say, the DVD recorder 200*a* may record the content CNT on the DVD 400*a* in such a manner that the content CNT can not be played back by devices that belong to the group of the DVD recorder 200*a* but exclusively by devices that belong to the other group.

Further, for example, it is possible to externally input device secret information DS of another playback device to the DVD recorder 200*a*, so that the DVD recorder 200*a* is capable of transferring a content CNT to another user who owns the other playback device. That is to say, the DVD recorder 200*a* records the content CNT to the DVD 400*a* in a manner that the content CNT can not be played back by the DVD recorder 200a that is used to record the content, but exclusively by the other playback device.

(6) Further, the DVD recorder 200a may use digital watermarking technology to embed information required by recordation control information RCI into a content CNT that is distributed from a content distributor, and then record the content CNT to the DVD 400a.

For example, when the group dependency flag GFlag in the recordation control information RCI is set to "1", the DVD recorder 200a may record a content CNT to a recording medium after embedding the common secret information GS. In case where unauthorized copy or use of the content CNT is discovered, the group that conducted the unauthorized copy or use is identified by the common secret information GS embedded in the content CNT.

(7) In the above embodiment, the DVD recorder 200a records contents and other information to the DVD 400a. Yet, the target recording medium is not limited to an optical disc typified by a DVD, and may be a memory card composed of a semiconductor memory.

(8) In the above embodiment, a content CNT and recordation control information RCI are distributed to a user at the same time and via the same route. Yet, the present invention is not limited to such. The content CNT and the recordation control information RCI may be separately distributed to the user at different times via different routes.

In other words, it is not necessary to deliver contents with recordation control information RCI. Instead, contents are first distributed to a user, and a corresponding piece of recordation control information RCI may be distributed later according to a user-requested content ID.

For example, contents CNT may be put to the market in form of a recording medium such as CD-ROM or DVD-RAM, and recordation control information RCI may be distributed via the Internet. In another example, contents CNT maybe distributed via digital broadcasting, and recordation control information RCI may be sold to a user at a store by recording the recordation control information RCI to a user-owned memory card.

In such a system that separately distributes contents CNT and recordation control information RCI, it is necessary to assure correct correspondence between contents CNT and pieces of recordation control information RCI. The correct correspondence may be assured in the following manner.

(a) First, a content distributor distributes a content CNT and recordation control information RCI through the use of a distribution server, and a user receives the content CNT through the use of a recording device.

(b) The distribution server distributes a content ID along with the contents CNT to the recording device. The content ID uniquely identifies the content CNT and is appended with a digital signature of the content distributor.

(c) The distribution server and the recording device commonly store secret information SK, and the recording device shares a key with the distribution server via the Internet. The key sharing may be done in the following manner, for example. The recording device generates a key on a random basis, and encrypts the generated key using the shared secret information SK, and transmits the encrypted key to the distribution server. In response, the distribution server decrypts the received key using the shared secret information SK. Consequently, the distribution server and the recording device share the key that is generated by the recording device on a random basis.

(d) The recording device encrypts a content ID using the shared key and transmits to the distribution server, the encrypted content ID together with the digital signature of the content distributor.

(e) The distribution server verifies the digital signature to see if the content ID has been tampered. On confirming that the content ID has not been tampered, the distribution server encrypts using the shared key, the recordation control information RCI that corresponds to the content ID, and transmits the encrypted recordation control information RCI to the recording device.

There are other schemes to assure correct correspondence between a content CNT and recordation control information RCI. Yet, such schemes are not within the scope of the present invention, so that description thereof is omitted here.

With this arrangement, the following is possible. The content distributor distributes, for example, recordation control information RCI that is composed of GFlag=0, MFlag=0, DFlag=1, and UFlag=0 when the amount charged to the user is relatively small. With the above recordation control information RCI, the user is permitted to play back the content CNT only with the recorder that is used to record the content CNT. On the other hand, when the amount charged to the user is relatively large, the content distributor distributes recordation control information RCI that is composed of GFlag=1, MFlag=1, DFlag=0, and UFlag=0. With the above recordation control information RCI, any playback device that belong to a specific group is permitted to play back the content CNT recorded on a recording medium.

Further, for example, the content distributor first distributes the recordation control information RCI that is composed of GFlag=0, MFlag=1, DFlag=0, and UFlag=0 along with the content CNT. As a result, the user is initially allowed to play back the content CNT only with the recording device that is used to record the content CNT. After a lapse of time and the content CNT is no longer new, the content distributor then distributes another piece of recordation control information RCI that is composed of GFlag=1, MFlag=1, DFlag=0, and UFlag=0. As a result, the content CNT recorded on the recording medium is then permitted to be played back with any playback devices that belong to a specific group.

In another example, the content distributor distributes the recordation control information RCI that is composed of GFlag=1, MFlag=1, DFlag=0, and UFlag=0 to all the users being a member of a specific group, while distributing the recordation control information RCI that is composed of GFlag=0, MFlag=0, DFlag=1, and UFlag=0 to non-member users.

As has been described by way of the examples, content distributors are allowed to provide various usage patterns even more flexibly than the above embodiment.

(9) Each of the DVD recorder, the DVD player, the personal computer, the DVD recorder/player may be partly constructed of a removable and portable module. Examples of such a portable module include an SD card and an IC card.

For example, any or some, or even all of the components constituting the DVD recorder 200a, namely the communications unit 201, the content key generating unit 202, the control unit 203, the encryption key generating unit 204, the encryption unit 205, the encryption unit 206, the drive unit 207, the common secret information storage unit 208, the device secret information storage unit 209, the input receiving unit 210, the display unit 211, and the authentication unit 213 may be a portable module that is composed of a microprocessor and a semiconductor memory.

Similarly, any or some, or even all of the components constituting the DVD player 300a, namely the drive unit 301, the control unit 302, the encryption key generating unit 303, the decryption unit 304, the decryption unit 305, the playback unit 306, the common secret information storage unit 307, the device secret information storage unit 308, the input unit 323, and the display unit 324 may be a portable module.

For example, the common secret information storage unit 307 of the DVD player 300a may be an SD memory card.

With this structure, the common secret information GS is stored into a playback device via an SD memory card even when the playback device is a vehicle-mounted type or a mobile type that has no connections to another device and thus the common secret information GS is not readily stored.

In another example, the device secret information storage units 308 and 209 respectively of the DVD player 300a and the DVD recorder/player 200c may be one and the same SD memory card and thus is removable.

With this structure, the following is possible. Suppose that the recordation control information RCI of a content CNT is composed of GFlag=0, MFlag=0, DFlag=1, and UFlag=0, thereby permitting the user to play back a content CNT only with the recording device that is used to record the content CNT. Here, when the content CNT is recorded by the DVD recorder/player 200c on which an SD memory card serving as the device secret information storage unit is mounted, any playback device is permitted to play back the content CNT on condition that the SD memory card is mounted.

With the above structure so as to construct recording devices and/or playback devices are partly constructed of a removable component, users are permitted even more flexible use of contents, and the copyright of the content distributor is still protected.

(10) In the above embodiment, the server 100 transmits one content with one or two pieces of recordation control information RCI to the DVD recorder 200a. Note that when a content is transmitted with a single piece of recordation control information RCI, the content is bound by that piece of recordation control information RCI throughout its lifetime. On the other hand, when a content is transmitted with two pieces of recordation control information RCI, the content is bond by a first piece of recordation control information RCI at a first stage of its lifetime, and by a second piece of the recordation control information RCI at a later stage.

The present invention, however, is not limited thereto.

For example, a content may be transmitted from the server 100 to the DVD recorder 200a in association with three pieces of recordation control information RCI. Here, the first piece of the recordation control information RCI may be used during a first six months since the content is used for the first time, and the second piece of recordation control information RCI may be used during a year that follows, and the third piece of recordation control information RCI maybe used after expiry of the one-year period.

Further, it is also applicable to transmit one content in association with even more pieces of recordation control information RCI.

(11) The above embodiment may be modified so that the server 100 appends a digital signature to recordation control information RCI when transmitting the recordation control information RCI to the DVD recorder 200a. With this arrangement, the recordation control information RCI is protected from tampering.

To be more specific, the server 100 pre-stores a public key of the DVD recorder 200a according to a public-key encryption system. The server 100 generates a digital signature from the recordation control information RCI using the public key to generate digital signature data, and transmits the generated digital signature data.

The DVD recorder 200a stores a secret key. On receiving the digital signature data, the DVD recorder 200a verifies the received recordation control information RCI using the digital signature data to see whether there is any tampering. Judging that the recordation control information RCI has not been tampered, the DVD recorder 200a continues to use the recordation control information RCI. Judging that the recordation control information RCI has been tampered, the DVD recorder 200a no longer uses the recordation control information RCI, and requests for the sever 100 for another piece of the recordation control information RCI.

(12) The DVD recorder 200a may be so constructed that the user of the DVD recorder 200a is able to transfer the right to use the content to another user.

To this end, the DVD recorder 200a once decrypts an encrypted content recorded on the DVD 400a to generate a content. Consequently, the DVD recorder 200a may additionally include components similar to those of the DVD player 300a.

Here, the DVD recorder 200a receives a device key (and/or a group key) of a destination recording device owned by the user being the transferee, and generates an encryption key from the received device key (and/or the group key) based on the recordation control information. The DVD recorder 200a then encrypts a content key using the generated encryption key, encrypts the content using the content key, writes the recordation control information, the encrypted content key, and the encrypted content to another recording medium.

On writing the content to the other recording medium, the DVD recorder 200a deletes from the DVD 400a, the recordation control information RCI, the encrypted content key, and the encrypted content. Yet, the condition information recorded on the DVD 400a shows the "permitted to hold" condition, it is not necessary to delete the content and relevant information since the server 100 permits the DVD 400a to hold the content even after transferring the content.

Further, the content may be transferred only when the condition information recorded on the DVD 400a shows the "permitted to transfer" condition. As above, transfer of contents may be performed on permission from the server 100.

Further, any of the following arrangements may be made for secure transmission of a device key and other information from a destination recording device to the DVD recorder 200a.

(a) To connect the DVD recorder 200a and the destination recording device with a dedicated line, so that a device key and other information is transmitted via the dedicated line.

(b) To perform mutual authentication, so that the destination device transmits a device key in encrypted form only when the mutual authentication succeeds.

(c) The source device (i.e. the DVD recorder 200a) pre-stores a secret key and a public key according to a public-key encryption system, and transmits the public key to the destination device.

The destination device receives the public key, and encrypts a device key (and/or the group key) using the received public key to generate an encrypted device key, and transmits the encrypted device key to the source device.

The source device receives the encrypted device key, and decrypts the received encrypted device key using the secret key stored therein to generate a device key.

Further, it is applicable that the source device newly receives another piece of recordation control information RCI from the destination device or from the server, and uses the newly received recordation control information RCI in the future processing.

(13) In the above embodiment, there is a case where condition information of a content shows that different pieces of recordation control information RCI are to be used before and after a predetermined number of times of use of the content (ten times in the above embodiment) or expiry of a predetermined time period (six months in the above embodiment). In such a case, the server 100 transmits two pieces of recordation control information RCI to the DVD recorder 200a along with the condition information showing either the "ten-time use" condition or the "six-month use" condition. Yet, the following modification may be made.

Suppose that the condition information shows the "ten-time use" condition.

In response to a content transmission request from the DVD recorder 200a, the server 100 performs the processing for payment in the manner described above, generates user purchase information, and additionally writes the generated user purchase information to the user table 151. The user purchase information generated herein includes two dependency information IDs. Next, the server 100 transmits to the DVD recorder 200a, the requested content, the condition information showing the "ten-time use" condition, and first recordation control information RCI that is to be used until the content is used ten times. Here, the first recordation control information RCI corresponds to the first one of the two dependency information IDs that are included in the user purchase information having the user ID and the content ID in the user table 151.

The DVD recorder 200a receives the condition information, the first recordation control information RCI, and the content. The DVD recorder 200a then generates, in the above-described manner, an encrypted content key ECK and an encrypted content ECNT based on the received first recordation control information RCI, and writes the received condition information, the first recordation control information RCI, first RCI identification information, the encrypted content key ECK, and the encrypted content ECNT to the DVD 400a. Here, the DVD recorder 200a writes to the DVD 400a, the first recordation control information RCI and the first RCI identification information in association with each other. Note the first RCI identification information indicates that the first recordation control information RCI is to be used until the content is used ten times.

Next, the user mounts the DVD 400a on the DVD player 300a. Here, the DVD 400a stores the condition information, the first recordation control information RCI, the first RCI identification information, the encrypted content key ECK, and the encrypted content ECNT.

In response to a user instruction, the DVD player 300a decrypts the encrypted content ECNT recorded on the DVD 400a and plays back the decrypted content. Prior to the decryption, the DVD player 300a judges, with reference to the cumulative number of times of playback stored therein, whether the content has been used for the predetermined number of times, i.e. ten times, shown by the condition information. Next, the DVD player 300a judges whether the first RCI identification information is recorded on the DVD 400a. In the case of judging that the content has been used less than ten times and that the first RCI identification information is recorded on the DVD 400a, the DVD player 300a decrypts the encrypted content and plays back the decrypted content in the above-stated manner using the first recordation control information RCI. In the case of judging that the content has been used less than ten times and that no first RCI identification information is recorded on the DVD 400a, the DVD player 300a does not decrypt the encrypted content as the DVD 400a may have been maliciously altered.

In the case of judging that the content has been used for ten times or more already, the control unit 302 of the DVD player 300a controls the display unit 324 so as to display the message reading "playback of the content is prohibited since the content has been already used ten times of more." In this case, the DVD player 300a does not perform decryption and playback of the content.

Here, the user mounts the DVD 400a on the DVD recorder 200a, and instructs the DVD recorder 200a to acquire second recordation control information RCI of the content from the server 100, and newly encrypt the content based on the second recordation control information RCI. The second recordation control information RCI is recordation control information that is to be used after the content is used ten times.

In response to the mounting of the DVD 400a and the user instruction described above, the DVD recorder 200a requests the server 100 for the second recordation control information RCI that is to be used after the content is used ten times. When making the request, the DVD recorder 200a transmits the user ID and the content ID to the server 100.

On receiving the user ID and the content ID from the DVD recorder 200a, the server 100 extracts from the user table 151 a piece of user purchase information including the received user ID and content ID, and then extracts the second of the two dependency information IDs from the extracted piece of purchase information. The server 100 then extracts from the dependency information table 121, a piece of dependency information that is identified by the extracted dependency information ID. The server 100 then generates the second recordation control information RCI that is composed of the four dependency flags included in the extracted dependency information, and transmits the generated second recordation control information RCI to the DVD recorder 200a.

The DVD recorder 200a additionally includes components similar to those of the DVD player 300a. The DVD recorder 200a decrypts the encrypted content ECNT using the first recordation control information RCI and the encrypted content key ECK to generate a content. The first recordation control information RCI, the encrypted content key ECK, and the encrypted content ECNT are recorded on the DVD 400a.

Next, the DVD recorder 200a receives the second recordation control information RCI, and generates an encrypted content key ECK' and an encrypted content ECNT' based on the second recordation control information RCI and the generated content. The DVD recorder 200a then writes to the DVD 400a, the second recordation control information RCI, second RCI identification information, the encrypted content key ECK', and the encrypted content ECNT'. At the time of writing, the DVD recorder 200a records on the DVD 400a, the second recordation control information RCI and the second RCI identification information in association with each other. Note that the second RCI identification information indicates that the second recordation control information RCI is to be used after the content is used ten times. The DVD recorder 200a then deletes the first recordation control information RCI, the first RCI identification information, the encrypted content key ECK, and the encrypted content ECNT from the DVD 400a.

Next, the user mounts the DVD 400a on the DVD player 300a and instructs the DVD player 300a to play back the content. The DVD 400a at this stage stores the condition information, the second recordation control information RCI, the second RCI identification information, and the encrypted content key ECK', and the encrypted content ECNT'.

In response to the user instruction, the DVD player 300a decrypts the encrypted content ECNT' that is recorded on the DVD 400a, and plays back the decrypted content. Prior to the decryption, the DVD player 300a judges, with reference to the cumulative times of playback stored therein, whether the content has been used for the predetermined number of times, i.e. ten times, shown by the condition information. Next, the DVD player 300a judges whether the second RCI identification information is recorded on the DVD 400a. In the case of jugging that the content has been used for ten times or more and that the second recordation control information RCI is recorded on the DVD 400a, the DVD player 300a decrypts the encrypted content ECNT' in the above-mentioned manner based on the second recordation control information RCI, and plays back the decrypted content. In the case of judging that the content has been used for ten times or more and that no second recordation control information RCI is recorded on the DVD 400a, the DVD player 300a does not decrypt the encrypted content as the DVD 400a may have been maliciously altered.

As descried above, the present invention may be modified so as to first transmit a piece of recordation control information, and later transmit another piece of recordation control information from the server 100 to the DVD recorder 200a after the content is used for a predetermined number of times, rather than transmitting two pieces of recordation control information in advance.

In the above description, the modification is made to the case where different pieces of recordation control information RCI are used before and after the content is used a predetermined number of times. Also, a similar modification maybe made to the case where two different pieces of recordation control information RCI are used before and after expiry of a predetermined time period.

Further, in the above embodiment, it is the DVD player 300a that monitors the expiry of the predetermined time period. Yet, it may be applicable that the DVD recorder 200a monitors expiry of the predetermined time period, and receives, on confirming the expiry of the predetermined time period, the second recordation control information RCI from the server 100. Further, it is also applicable that the server 100 monitors expiry of the predetermined time period, and transmits, on confirming the expiry of the predetermined time period, the second recordation control information RCI to the DVD recorder 200a.

Further, in the above embodiment, the payment for the total charge is made when the DVD recorder 200a requests the server 100 for transmission of a content. Yet, it is also applicable that the payment is made each time the DVD recorder 200a receives recordation control information RCI.

(14) Each of the above devices may be specifically a computer system composed generally of a microprocessor, ROM, RAM, a hard disk unit, a display unit, a keyboard, and a mouse. The RAM or the hard disk unit stores a computer program. Each device performs its function by the microprocessor operating according to the computer program.

(15) The present invention may be embodied as methods shown above. Further, each of the methods may be a computer program run by a computer, or a digital signal representing the computer program.

Further, the present invention may be embodied as a computer-readable recording medium storing the computer program or the digital signal. Examples of such a recording medium include a flexible disk, a hard disk, CD-ROM, MO, DVD, DVD-ROM, DVD-RAM, BD (Blu-ray Disc) and a semiconductor memory. Further, the present invention may be embodied as the computer program or the digital signal recorded on any recording medium mentioned above.

Further, the present invention may be embodied as the computer program or the digital signal transmitted via an electric communication line, wireless communications, a wired communication line, or a network typified by the Internet.

Further, the present invention may be embodied as a computer system composed of a microprocessor and memory. The memory stores the computer program mentioned above. The microprocessor may operate according to the computer program.

Further, the program or the digital signal may be transferred in form of a recording medium mentioned above, or via a network mentioned above, so that the program or the digital signal may be executed by another independent computer system.

(16) The present invention may be any combination of the above-described embodiment and modifications.

4. Effects of the Present Invention

As has been described, the present invention is made in view of problems involved in conventional techniques. According to the present invention, a content distributor distributes suitably determined recordation control information, so that various restrictions are imposed on playback devices that are permitted to playback a content (i.e. digital work) recorded on a recording medium. This arrangement enables the content distributor to flexibly permit various usage patterns for each user and/or each content, while protecting the copyright of the content distributor.

With the above advantage, the present invention is of great value as the present invention provides a digital work protection system, a recording device, and a playback device that are not achieved by conventional techniques.

In one aspect, the present invention provides a digital work protection system for protecting digital works from unauthorized use. The digital work protection system is composed of a recording device and a playback device. The recording device includes a digital work acquiring unit, a first key acquiring unit, a first key generating unit, an encrypting unit, and a writing unit. The digital work acquiring unit is operable to acquire a digital work and range information showing a permission range within which the digital work is permitted to be used. The permission range is composed of at least one subrange adopted out of a plurality of subranges. The range information includes a plurality of pieces of adoption information each corresponding to one of the subranges and showing whether a corresponding subrange is to be adopted. The first key acquiring unit is operable to acquire a subrange key for each subrange that is shown to be adopted in the adoption information, thereby acquiring at least one subrange key. The first key generating unit is operable to generate an encryption key using all the acquired subrange keys. The encrypting unit is operable to encrypt the digital work based on the encryption key, thereby generating encrypted information. The writing unit is operable to write the range information and the encrypted information to a recording medium. The playback device includes a reading unit, a second key acquiring unit, a second key generating unit, a digital work generating unit, and a playback unit. The reading unit is operable to read the range information and the encrypted information from the recording medium. The second key acquiring unit is operable to acquire a subrange key for each subrange that is shown to be adopted in the adoption information included in the read range information, thereby acquiring at least one subrange key. The second key generating unit is operable to generate a decryption key using all the subrange keys acquired by the second key acquiring unit. The digital work generating unit is operable to decrypt the read encrypted information based on the decryption key, thereby generating a digital work. The playback unit is operable to play back the generated digital work.

With this structure, the recording device writes range information and encrypted information to a recording medium. The range information is composed of a plurality of pieces of adoption information each showing whether a corresponding subrange is to be adopted, and the encrypted information is generated by encrypting a digital work based on subrange keys acquired according to the adoption information. Consequently, the permission range within which the digital work is permitted to be used is flexibly determined by suitably adopting any of the plurality of subranges. In addition, the playback device decrypts the encrypted information based on subrange keys acquired according to the adoption information, and plays back a digital work generated as a result of the decryption. Consequently, only playback devices capable of acquiring correct subrange keys that are shown to be adopted in the adoption information are allowed to decrypt the encrypted information and play back the resulting digital work.

In the above manner, the present invention enables a content distributor to flexibly determine different usage patterns for each digital work and/or for each user, while protecting the copyright of the content distributor.

Here, the digital work may be transferred from a user of the recording device to another user. The digital work acquiring unit may further acquire another piece of range information showing another permission range within which the other user is permitted to use the digital work. The other permission range is composed of at least one subrange adopted out of the subranges. The other piece of range information includes a plurality of pieces of adoption information each showing whether a corresponding one of the subranges is to be adopted. The first key acquiring unit may further acquire a subrange key for each subrange that is shown to be adopted in the adoption information included in the other piece of range information, thereby acquiring at least another subrange key. The first key generating unit may further generate another encryption key using the other subrange key. The encrypting unit may further encrypt the acquired digital work based on the other encryption key, thereby generating another piece of encrypted information. The writing unit may write the other piece of range information and the other piece of encrypted information to a recording medium.

With this structure, the recording device acquires the other piece of range information within which the other user is permitted to user the digital work, encrypts the digital work based on the acquired other piece of range information, and writes the encrypted information to the other recording medium. As a result, the digital work is transferred to the other user.

In another aspect, the present invention provides a recording device for recording digital works to a recording medium in encrypted form. The recording device includes a digital work acquiring unit, a key acquiring unit, a key generating unit, an encrypting unit, and a writing unit. The digital work acquiring unit is operable to acquire a digital work and range information showing a permission range within which the digital work is permitted to be used. The permission range is composed of at least one subrange adopted out of a plurality of subranges. The range information includes a plurality of pieces of adoption information each corresponding to one of the subranges and showing whether a corresponding subrange is to be adopted. The key acquiring unit is operable to acquire a subrange key for each subrange that is shown to be adopted in the adoption information, thereby acquiring at least one subrange key. The key generating unit is operable to generate an encryption key using all the acquired subrange key. The encrypting unit is operable to encrypt the digital work based on the encryption key, thereby generating encrypted information. The writing unit is operable to write the range information and the encrypted information to the recording medium.

With this structure, the recording device writes range information and encrypted information to a recording medium. The range information is composed of a plurality of pieces of adoption information each showing whether a corresponding subrange is to be adopted, and the encrypted information is generated by encrypting a digital work based on subrange keys acquired according to the adoption information. Consequently, the permission range within which the digital work is permitted to be used is flexibly determined by suitably adopting any of the plurality of subranges.

Here, the encrypting unit may acquire a content key that corresponds to the digital work, encrypt the digital work using the content key to generate an encrypted digital work, encrypt the content key using the encryption key to generate an encrypted content key, and generate the encrypted information that is composed of the encrypted digital work and the encrypted content key.

With this structure, the recording device acquires a content key, encrypts the digital work using the content key, and encrypts the content key using the encryption key. Consequently, the digital work is protected more firmly.

Here, the key generating unit may generate, when a plurality of subrange keys are acquired by the key acquiring unit, the encryption key by performing a predetermined arithmetic operation on the plurality of subrange keys.

With this structure, the recording device generates the encryption key by applying a predetermined arithmetic operation on the acquired subrange keys. Consequently, the reproducibility of the encryption key generation is assured.

Here, the key generating unit may generate the encryption key by performing the predetermined arithmetic operation so as to concatenate the acquired subrange keys.

With this structure, the recording device generates the encryption key by applying the predetermined arithmetic operation so as to concatenate all of the acquired subrange keys. Consequently, the predetermined arithmetic operation is performed easily.

Here, the plurality of subranges may be a group-subrange encompassing a group formed of a plurality of recording devices, a device-subrange encompassing a specific recording device, a user-subrange encompassing a specific user, and a medium-subrange encompassing a specific recording medium. The permission range may be composed of at least one of the group-subrange, the device-subrange, the user-subrange, and the medium-subrange. The range information may include the plurality of pieces of adoption information showing whether each of the group-subrange, the device-subrange, the user-subrange, and the medium-subrange is to be adopted. The digital work acquiring unit may acquire the range information that includes the plurality of pieces of adoption information. The key acquiring unit may acquire a subrange key for each subrange that is shown to be adopted out of the group-subrange, the device-subrange, the user-subrange, and the medium-subrange.

With this structure, the plurality of subranges are a subrange encompassing a group formed of a plurality of recording devices, a subrange encompassing a specific recording device, a subrange encompassing a specific user, and a subrange encompassing a specific recording medium. Consequently, the permission range resulting from adopted subranges is practically usable.

Here, the digital work acquiring unit may acquire the range information and the digital work separately.

With this structure, the reading device acquires the range information and the digital work separately. Consequently, the range information and the digital work may be managed separately, which allows the management to be carried out in various manners.

Here, at least one of the key acquiring unit, the key generating unit, and the encrypting unit may be included in a portable module that is removable from the recording device.

With this structure, the portable module may be removed from the recording device before or after use, so that operations of any of the key acquiring unit, the key generating unit, and the encrypting unit may be prohibited.

Here, the plurality of pieces of adoption information included in the range information may differ depending on usage value of the digital work. The key acquiring unit may acquire the subrange key using the plurality of pieces of adoption information that differ depending on the usage value of the digital work.

With this structure, the pieces of adoption information included in each piece of range information differ depending on usage value of the digital work, so that various usage patterns are provided for the user.

Here, each piece of the adoption information included in the range information may show whether a corresponding subrange is to be adopted so as to impose stricter restrictions on usage of the digital work at an early stage and to impose loosened restrictions on usage of the digital work at a later stage. The key acquiring unit may refer to the range information that imposes the stricter restrictions at the early stage, and to the range information that imposes the loosened restrictions at the later stage.

With this structure, the pieces of adoption information in the range information impose stricter restrictions on usage of the digital work at an early stage, and loosened restriction on usage of the digital work at a later stage. Consequently, the users may be provided with usage patterns that are more suitable and convenient.

Here, each piece of the adoption information included in the range information may show whether a corresponding subrange is to be adopted so as to impose stricter restrictions on usage of the digital work that has been used less than a predetermined number of times, and to impose loosened restrictions on usage of the digital work that has been used the predetermined number of times or more. The key acquiring unit may refer to the range information that imposes the stricter restrictions on usage of the digital work that has been used less than the predetermined number of times, and to the range information that imposes the loosened restrictions on usage of the digital work that has been used the predetermined number of times or more.

With this structure, the pieces of adoption information in the range information impose stricter restrictions on usage of the digital work up to a predetermined number of times, and loosened restriction on usage of the digital work for the predetermined number of times and thereafter. Consequently, the users may be provided with usage patterns that are more suitable and convenient. Consequently, the user is provided with usage patterns that are more suitable and convenient.

Here, the digital work acquiring unit may further acquire another piece of range information showing another permission range within which the digital work is permitted to be used. The other permission range is composed of at least one subrange adopted out of the subranges. The other piece of range information includes a plurality of pieces of adoption information each showing whether a corresponding one of the subranges is to be adopted. The key acquiring unit may further acquire a subrange key for each subrange that is shown to be adopted in the adoption information included in the other piece of range information, thereby acquiring at least another subrange key. The key generating unit may further generate another encryption key using the other subrange key. The encrypting unit may further encrypt the digital work based on the other encryption key, thereby generating another piece of encrypted information. The writing unit may further write the other piece of range information and the other piece of encrypted information to a recording medium.

With this structure, the recording device acquires the other range information showing the other permission range of the digital work, and uses the acquired other permission range information. Consequently, the same digital work is permitted to be used within different permission ranges.

Here, the digital work acquiring unit may acquire the other piece of range information from a center device that manages the other piece of range information.

With this structure, the recording device acquires the other range information that is reliable.

Here, the digital work acquiring unit may acquire the other piece of range information on payment of an amount for the other piece of range information.

With this structure, the recording device provides the user with a different piece of range information depending on the payment.

Here, the digital work may be transferred from a user of the recording device to another user. The digital work acquiring unit may further acquire another piece of range information showing another permission range within which the other user is permitted to use the digital work. The other permission range is composed of at least one subrange adopted out of the subranges. The other piece of range information includes a plurality of pieces of adoption information each showing whether a corresponding one of the subranges is to be adopted. The key acquiring unit may further acquire a subrange key for each subrange that is shown to be adopted in the adoption information included in the other piece of range information, thereby acquiring at least another subrange key. The key generating unit may further generate another encryption key using the other subrange key. The encrypting unit may further encrypt the digital work based on the other encryption key, thereby generating another piece of encrypted information. The writing unit may write the other piece of range information and the other piece of encrypted information to a recording medium.

With this structure, the recording device acquires the other piece of range information within which the other user is permitted to user the digital work, encrypts the digital work based on the acquired other piece of range information, and writes the encrypted information to the other recording medium. As a result, the digital work is transferred to the other user.

Here, the digital work acquiring unit may store the acquired digital work. The recording device may further include a deleting unit operable to delete the digital work from the digital work acquiring unit.

With this structure, the recording device deletes the digital work that is stored therein after transferring the digital work to another device, which leads to prevent unauthorized use of the digital work by the device being a transfer source device.

Here, the digital work acquiring unit may securely acquire the other piece of range information.

With this structure, the recording device acquires the range information in a secure manner, so that the correct usage right is assured to be given to the user.

Here, the digital work acquiring unit may acquire the other piece of range information with permission by a center device that manages the other piece of range information.

With this structure, the recording device acquires the other range information with permission by the center device, so that correct usage right is assured to be given to the user.

Here, the recording device may further include: a reading unit operable to read the range information and the encrypted information from the recording medium; a key acquiring unit operable to acquire a subrange key for each subrange that is shown to be adopted in the adoption information included in the read range information, thereby acquiring at least one subrange key; a key generating unit operable to generate a decryption key using the acquired subrange keys; a digital work generating unit operable to decrypt the read encrypted information based on the decryption key, thereby generating a digital work; and a playback unit operable to play back the generated digital work.

With this structure, the recording device decrypts the encrypted information based on subrange keys acquired according to the adoption information, and plays back a digital work generated as a result of the decryption. Consequently, only devices capable of acquiring correct subrange keys that are shown to be adopted in the adoption information are allowed to decrypt the encrypted information and play back the resulting digital work.

In another aspect, the present invention provides a playback device for reading and playing back digital works recorded on a recording medium by a recording device. The recording device (i) acquires a digital work and range information showing a permission range within which the digital work is permitted to be used, the permission range being composed of at least one subrange adopted out of a plurality of subranges, the range information including a plurality of pieces of adoption information each corresponding to one of the subranges and showing whether a corresponding subrange is to be adopted, (ii) acquires a subrange key for each a subrange that is shown to be adopted in the adoption information, thereby acquiring at least one subrange key, (iii) generates an encryption key using all the acquired subrange keys, (iv) encrypts the digital work based on the encryption key, thereby generating encrypted information, and (v) writes the range information and the encrypted information to the recording medium. The playback device includes: a reading unit operable to read the range information and the encrypted information from the recording medium; a key acquiring unit operable to acquire a subrange key for each subrange that is shown to be adopted in the adoption information, thereby acquiring at least one subrange key; a key generating unit operable to generate a decryption key using all the subrange keys acquired by the key acquiring unit; a digital work generating unit operable to decrypt the read encrypted information based on the decryption key, thereby generating a digital work; and a playback unit operable to play back the generated digital work.

With this structure, the playback device decrypts the encrypted information based on subrange keys acquired according to the adoption information, and plays back a digital work generated as a result of the decryption. Consequently, only playback devices capable of acquiring correct subrange keys that are shown to be adopted in the adoption information are allowed to decrypt the encrypted information and play back the resulting digital work.

Here, the recording device may acquire a content key that corresponds to the digital work, encrypt the digital work using the content key to generate an encrypted digital work, encrypt the content key using the encryption key to generate an encrypted content key, and generate the encrypted information that is composed of the encrypted digital work and the encrypted content key. The reading unit may read the encrypted information that is composed of the encrypted content key and the encrypted digital work from the recording medium. The digital work generating unit may decrypt the encrypted content key using the decryption key to generate a content key, and decrypt the encrypted digital work using the content key to generate a digital work.

With this structure, the playback device reads the encrypted content key and the encrypted digital work from the recording medium, decrypts the encrypted content key using the generated decryption key, and decrypts the encrypted digital work using the generated content key. Consequently, the digital work is protected more firmly.

Here, the recording device may generate, when a plurality of subrange keys are acquired, the encryption key by performing a predetermined arithmetic operation on the plurality of subrange keys. The key generating unit may generate, when a plurality of subrange keys are acquired by the key acquiring unit, the decryption key by performing the predetermined arithmetic operation on the plurality of subrange keys.

With this structure, the recording device generates the encryption key by applying a predetermined arithmetic operation on the acquired subrange keys. Consequently, the reproducibility of the encryption key generation is assured.

Here, the recording device may generate the encryption key by performing the predetermined arithmetic operation so as to concatenate the subrange keys acquired by the recording device. The key generating unit may generate the decryption key by performing the predetermined arithmetic operation so as to concatenate the subrange keys acquired by the key acquiring unit.

With this structure, the recording device generates the encryption key by applying the predetermined arithmetic operation so as to concatenate all of the acquired subrange keys. Consequently, the predetermined arithmetic operation is performed easily.

Here, the plurality of subranges may be a group-subrange encompassing a group formed of a plurality of recording devices, a device-subrange encompassing a specific recording device, a user-subrange encompassing a specific user, and a medium-subrange encompassing a specific recording medium. The permission range may be composed of at least one of the group-subrange, the device-subrange, the user-subrange, and the medium-subrange. The range information may include the plurality of pieces of adoption information showing whether each of the group-subrange, the device-subrange, the user-subrange, and the medium-subrange is to be adopted. The key acquiring unit may acquire a subrange key for each subrange that is shown to be adopted out of the group-subrange, the device-subrange, the user-subrange, and the medium-subrange. The key generating unit may generate the decryption key using the acquired subrange keys.

With this structure, the plurality of subranges are a subrange encompassing a group formed of a plurality of recording devices, a subrange encompassing a specific recording device, a subrange encompassing a specific user, and a subrange encompassing a specific recording medium. Consequently, the permission range resulting from adopted subranges is practically usable.

Here, at least one of the key acquiring unit, the key generating unit, and the digital work generating unit may be included in a portable module that is removable from the playback device.

With this structure, the portable module may be removed from the recording device before or after use, so that operations of any of the key acquiring unit, the key generating unit, and the encrypting unit may be prohibited.

Here, the plurality of pieces of adoption information included in the range information that is read by the reading unit may differ depending on usage value of the digital work. The key acquiring unit may acquire the subrange key using the plurality of pieces of adoption information that differ depending on the usage of the digital work.

With this structure, the pieces of adoption information included in each piece of range information differ depending on usage value of the digital work, so that various usage patterns are provided for the user.

Here, each piece of the adoption information included in the range information may show whether a corresponding subrange is to be adopted so as to impose stricter restrictions on usage of the digital work at an early stage and to impose loosened restrictions on usage of the digital work at a later stage. The key acquiring unit may refer to the range information that imposes the stricter restrictions at the early stage, and to the range information that imposes the loosened restrictions at the later stage.

With this structure, the pieces of adoption information in the range information impose stricter restrictions on usage of the digital work at an early stage, and loosened restriction on usage of the digital work at a later stage. Consequently, the users may be provided with usage patterns that are more suitable and convenient.

Here, each piece of the adoption information included in the range information may show whether a corresponding subrange is to be adopted so as to impose stricter restrictions on usage of the digital work that has been used less than a predetermined number of times, and to impose loosened restrictions on usage of the digital work that has been used the predetermined number of times or more. The key acquiring unit may refer to the range information that imposes the stricter restrictions on usage of the digital work that has been used less than the predetermined number of times, and to the range information that imposes the loosened restrictions on usage of the digital work that has been used the predetermined number of times or more.

With this structure, the pieces of adoption information in the range information impose stricter restrictions on usage of the digital work up to a predetermined number of times, and loosened restriction on usage of the digital work for the predetermined number of times and thereafter. Consequently, the users may be provided with usage patterns that are more suitable and convenient. Consequently, the user is provided with usage patterns that are more suitable and convenient.

Here, the recording device may further (i) acquire another piece of range information showing another permission range within which the digital work is permitted to be used, the other permission range being composed of at least one subrange adopted out of the subranges, and the other piece of range information including a plurality of pieces of adoption information each showing whether a corresponding one of the subranges is to be adopted, (ii) acquire a subrange key for each subrange that is shown to be adopted in the adoption information included in the other piece of range information, thereby acquiring at least another subrange key, (iii) generate another encryption key using the other subrange key, (iv) encrypt the acquired digital work based on the other encryption key, thereby generating another piece of encrypted information, and (v) write the other piece of range information and the other piece of encrypted information to a recording medium. The reading unit may further read the other piece of range information and the other piece of encrypted information. The key acquiring unit may further acquire a subrange key for each subrange that is shown to be adopted in the adoption information included in the other piece of range information, thereby acquiring at lease another subrange key. The key generating unit may further generate another decryption key using the other subrange key. The digital work generating unit may further decrypt the other piece of encrypted information based on the other decryption key, thereby generating the digital work. The playback unit may play back the generated digital work.

With this structure, the recording device acquires the other range information showing the other permission range of the digital work, and uses the acquired other permission range information. Consequently, the same digital work is permitted to be used within different permission ranges.

5. Industrial Applicability

The present invention is applicable to industries for selling or renting copyrighted digital works, such as music, movies, and novels, on a business basis, i.e. on a repetitive and continual basis.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A recording device for encrypting a digital work that corresponds to a permission range within which the digital work is permitted to be used and for recording the digital work in encrypted form to a recording medium, the recording device comprising:
    a memory device that stores a program, the program when executed causes the recording device to operate as:
    a digital work acquiring unit that acquires the digital work and range information indicating the permission range in which the digital work is permitted to be used, the permission range including a plurality of subranges, the plurality of subranges being different from other respective subranges, and the range information including a plurality of adoption information, each of the plurality of the adoption information being corresponded to one of the plurality of the subranges and indicating whether a corresponding subrange is to be adopted;
    a judging unit that judges whether each piece of adoption information indicates that a corresponding subrange is to be adopted;
    a key acquiring unit that acquires a subrange key for each subrange indicated to be adopted by the corresponding adoption information when the corresponding adoption information indicates that the corresponding subrange is to be adopted, thereby acquiring one or more subrange keys;
    a key generating unit that generates an encryption key using the one or more acquired subrange keys;
    an encrypting unit that encrypts the digital work based on the encryption key, thereby generating encrypted information; and
    a writing unit that writes the range information and the encrypted information to the recording medium.

2. The recording device according to claim 1, wherein
    said encrypting unit acquires a content key that corresponds to the digital work, encrypt the digital work using the content key to generate an encrypted digital work, encrypt the content key using the encryption key to generate an encrypted content key, and generate the encrypted information that includes the encrypted digital work and the encrypted content key.

3. The recording device according to claim 2, wherein the key generating unit generates, when a plurality of subrange keys are acquired by said key acquiring unit, the encryption key by performing a predetermined arithmetic operation on the plurality of subrange keys.

4. The recording device according to claim 3, wherein said key generating unit generates the encryption key by performing the predetermined arithmetic operation so as to concatenate the acquired plurality of subrange keys.

5. The recording device according to claim 2, wherein the plurality of subranges includes a group-subrange, the group-range encompassing a group formed of a plurality of recording devices, a device-subrange encompassing a specific recording device, a user-subrange encompassing a specific user, and a medium-subrange encompassing a specific recording medium, the permission range includes at least one of the group-subrange, the device-subrange, the user-subrange, and the medium-subrange, the range information includes the plurality of adoption information indicating whether each of the group-subrange, the device-subrange, the user-subrange, and the medium-subrange is to be adopted, said digital work acquiring unit acquires the range information that includes the plurality of adoption information, and said key acquiring unit acquires a subrange key for each subrange that is indicated to be adopted out of the group-subrange, the device-subrange, the user-subrange, and the medium-subrange.

6. The recording device according to claim 2, wherein said digital work acquiring unit acquires the range information and the digital work separately.

7. The recording device according to claim 2, wherein at least one of said key acquiring unit, said key generating unit, and said encrypting unit is included in a portable module that is removable from the recording device.

8. The recording device according to claim 2, wherein the plurality of adoption information included in the range information differs depending on a value for the digital work, and said key acquiring unit acquires the subrange key using the plurality of adoption information that differs depending on the value for the digital work.

9. The recording device according to claim 8, wherein the adoption information included in the range information indicates whether a corresponding subrange is to be adopted so as to impose stricter restrictions on usage of the digital work at an early stage and to impose loosened restrictions on usage of the digital work at a later stage, and said key acquiring unit refers to the range information that imposes the stricter restrictions at the early stage, and to the range information that imposes the loosened restrictions at the later stage when the adoption information indicates that the corresponding subrange is to be adopted so as to impose stricter restrictions on usage of the digital work at the early stage and to impose loosened restrictions on usage of the digital work at the later.

10. The recording device according to claim 8, wherein the adoption information included in the range information indicates whether a corresponding subrange is to be adopted so as to impose stricter restrictions on usage of the digital work that has been used less than a predetermined number of times, and to impose loosened restrictions on usage of the digital work that has been used the predetermined number of times or more, and said key acquiring unit refers to the range information that imposes the stricter restrictions on usage of the digital work that has been used less than the predetermined number of times, and to the range information that imposes the loosened restrictions on usage of the digital work that has been used the predetermined number of times or more when the adoption information indicates that the corresponding subrange is to be adopted so as to impose stricter restrictions on usage of the digital work that has been used less than the predetermined number of times, and to impose loosened restrictions on usage of the digital work that has been used the predetermined number of times or.

11. The recording device according to claim 2, wherein said digital work acquiring unit further acquires other range information indicating at least one other permission range within which the digital work is permitted to be used, the at least one other permission range including at least one subrange adopted out of the one or more subranges, and the other range information including a plurality of adoption information indicating whether a corresponding one of the one or more subranges is to be adopted, said key acquiring unit further acquires a subrange key for each subrange that is indicated to be adopted in the adoption information included in the other range information, thereby acquiring at least one other subrange key, the key generating unit further generates at least one other encryption key using the at least one other subrange key, said encrypting unit further encrypts the digital work based on the at least one other encryption key, thereby generating other encrypted information, and said writing unit further writes the other range information and the other encrypted information to a recording medium.

12. The recording device according to claim 11, wherein said digital work acquiring unit acquires the other range information from a center device that manages the other range information.

13. The recording device according to claim 12, wherein said digital work acquiring unit acquires the other range information on payment of an amount for the other range information.

14. The recording device according to claim 2, wherein the digital work is transferred from a user of the recording device to another user, said digital work acquiring unit further acquires other range information indicating at least one other permission range within which the other user is permitted to use the digital work, the at least one other permission range including at least one subrange adopted out of the one or more subranges, and the other range information including a plurality of adoption information indicating whether a corresponding one of the one or more subranges is to be adopted, said key acquiring unit further acquires a subrange key for each subrange that is indicated to be adopted in the adoption information included in the other range information, thereby acquiring at least one other subrange key, the key generating unit further generates at least one other encryption key using the at least one other subrange key, said encrypting unit further encrypts the digital work based on the at least one other encryption key, thereby generating other encrypted information, and said writing unit writes the other range information and other encrypted information to a recording medium.

15. The recording device according to claim 14, wherein said digital work acquiring unit stores the acquired digital work, the recording device further comprising a deleting unit that deletes the digital work from said digital working acquiring unit.

16. The recording device according to claim 15, wherein said digital work acquiring unit securely acquires the other range information.

17. The recording device according to claim 15, wherein said digital work acquiring unit acquires the other range information with permission by a center device that manages the other range information.

18. The recording device according to claim 15, wherein each of the plurality of subranges includes one of a group-subrange, a device-subrange, a user-subrange and a medium-subrange, the group-range encompassing a group formed of a plurality of recording devices, the device-subrange encompassing a specific recording device, the user-subrange encompassing a specific user, and the medium-subrange encompassing a specific recording medium.

19. The recording device according to claim 1, further comprising:
a reading unit that reads the range information and the encrypted information from the recording medium;
a key acquiring unit that acquires a subrange key for each subrange that is indicated to be adopted in the adoption information included in the read range information, thereby acquiring at least one subrange key;
a key generating unit that generates a decryption key using the acquired one or more subrange keys;
a digital work generating unit that decrypts the read encrypted information based on the decryption key, thereby generating a digital work; and
a playback unit that plays back the generated digital work.

20. A recording method for encrypting a digital work corresponding to a permission range within which the digital work is permitted to be used and for recording the digital work in encrypted form to a recording medium, the recording method comprising:
acquiring the digital work and range information indicating the permission range in which the digital work is permitted to be used, the permission range including a plurality of subranges, the plurality of subranges being different from the other respective subranges, and the range information including a plurality of adoption information, each of the plurality of the adoption information being corresponded to one of the plurality of the subranges and indicating whether a corresponding subrange is to be adopted;
judging whether each piece of adoption information indicates that a corresponding subrange is to be adopted;
acquiring a subrange key for each subrange that is indicated to be adopted by the corresponding adoption information when the corresponding adoption information indicates that the corresponding subrange is to be adopted, thereby acquiring one or more subrange keys;
generating an encryption key using all the acquired one or more subrange keys;
encrypting the digital work based on the encryption key, thereby generating encrypted information; and
writing the range information and the encrypted information to the recording medium.

21. A recording program stored on a computer-readable medium for causing a computer to perform a method of encrypting a digital work corresponding to a permission range within which the digital work is permitted to be used and for recording the digital work in encrypted form to a recording medium, the method comprising:
acquiring the digital work and range information indicating the permission range in which the digital work is permitted to be used, the permission range including a plurality of subranges, the plurality of subranges being different from other respective subranges, the range information including a plurality of adoption information, each of the plurality of the adoption information being corresponded to one of the plurality of the subranges and indicating whether a corresponding subrange is to be adopted;
judging whether each piece of adoption information indicates that a corresponding subrange is to be adopted;
acquiring a subrange key for each subrange that is indicated to be adopted by the corresponding adoption information when the corresponding adoption information indicates that the corresponding subrange is to be adopted, thereby acquiring one or more subrange keys;
generating an encryption key using all the acquired one or more subrange keys;
encrypting the digital work based on the encryption key, thereby generating encrypted information; and
writing the range information and the encrypted information to the recording medium.

\* \* \* \* \*